United States Patent
Avitan

(10) Patent No.: US 12,268,133 B2
(45) Date of Patent: Apr. 8, 2025

(54) METHODS AND SYSTEMS FOR CONTROLLED SOIL-LESS PLANT GROWING

(71) Applicant: Growee Technologies Ltd., Rishon Lezion (IL)

(72) Inventor: Idan Avitan, Nir Am (IL)

(73) Assignee: Growee Technologies Ltd., Rishon Lezion (IL)

(*) Notice: Subject to any disclaimer, the term of this patent is extended or adjusted under 35 U.S.C. 154(b) by 529 days.

(21) Appl. No.: 17/604,266

(22) PCT Filed: Apr. 16, 2020

(86) PCT No.: PCT/IL2020/050454
§ 371 (c)(1),
(2) Date: Oct. 15, 2021

(87) PCT Pub. No.: WO2020/212994
PCT Pub. Date: Oct. 22, 2020

(65) Prior Publication Data
US 2022/0183244 A1    Jun. 16, 2022

Related U.S. Application Data

(60) Provisional application No. 62/835,541, filed on Apr. 18, 2019.

(51) Int. Cl.
*A01G 31/02*    (2006.01)

(52) U.S. Cl.
CPC .................................. *A01G 31/02* (2013.01)

(58) Field of Classification Search
CPC ........ A01G 31/02; A01G 31/04; A01G 31/06; A01G 9/0297; A01G 31/00; A01G 9/022
See application file for complete search history.

(56) References Cited

U.S. PATENT DOCUMENTS

| | | | |
|---|---|---|---|
| 9,603,316 | B1 | 3/2017 | Mansey et al. |
| 11,825,784 | B1* | 11/2023 | Sankaranarayanan ...... A01G 31/02 |
| 2018/0014452 | A1 | 1/2018 | Starr |
| 2018/0184602 | A1 | 7/2018 | Ofir et al. |
| 2019/0075741 | A1* | 3/2019 | Olesen ............ A01G 31/06 |
| 2022/0143847 | A1* | 5/2022 | Bidram ........... B25J 19/0025 |
| 2023/0371447 | A1* | 11/2023 | Thul ................ A01G 9/247 |
| 2023/0380359 | A1* | 11/2023 | Vergeldt .......... A01G 27/003 |

FOREIGN PATENT DOCUMENTS

WO    2018007334    1/2018

OTHER PUBLICATIONS

International Search Report of PCT/IL2020/050454 Completed Jul. 8, 2020; mailed Jul. 8, 2020 2 pages.
Written Opinion of PCT/IL2020/050454 Completed Jul. 8, 2020; mailed Jul. 8, 2020 2 pages.

* cited by examiner

*Primary Examiner* — Kristen C Hayes
(74) *Attorney, Agent, or Firm* — The Roy Gross Law Firm, LLC; Roy D. Gross

(57) ABSTRACT

The present disclosure relates generally to controlled hydroponic plant growing systems.

19 Claims, 12 Drawing Sheets ns the background of the daily functions. For example, the system uses multi-sensor technology
METHODS AND SYSTEMS FOR CONTROLLED SOIL-LESS PLANT GROWING

TECHNICAL FIELD

The present disclosure relates generally to controlled hydroponic plant growing systems.

BACKGROUND OF THE INVENTION

Soilless agriculture/Hydroponics is the science of growing plants without soil. Hydroponics offers clear advances over soil, such as reduced water consumption and faster growth cycle. In recent years, hydroponics has become much more popular due to the limited space in most urban environments. Hydroponic systems offer an economical solution by allowing the utilization of unused space such as rooftops of urban buildings.

A soilless/hydroponic system typically has one or more water reservoirs encompassing plants' feeding solution(s). Water pH and the amount of nutrients and fertilizers in the water must be monitored and controlled in order to continuously meet the required conditions, during all stages of plant growth, of any plant strain under any environmental conditions. Wrong fertilizers, dose of additives (e.g. minerals) and/or wrong pH could cause damage to plant's yield and even lead to plant death.

There is an unmet need for systems and methods that continuously monitor the quality and contents of soilless feeding solution, and adjust the various parameters, such as, pH, nutrients, fertilizer and minerals, in real time, thereby avoiding replacement of the entire feeding solution in a reservoir.

SUMMARY OF THE INVENTION

Aspects of the disclosure, according to some embodiments thereof, relate to intelligent nutrients modeling and feeding algorithm for soil-less/hydroponic growing methods and to systems utilizing same. More specifically, but not exclusively, aspects of the disclosure, according to some embodiments thereof, relate to:

Provided herein is a system and use thereof for hydroponic gardening, configured to continuously monitor and adjust pH and nutrients levels of plants soil-less growing media, also termed herein feeding solution, as well as temperature (e.g. of air, growing media, and irrigation water), while avoiding replacement of the entire feeding solution in a reservoir, thereby provided cost-effective and intelligent technology.

The methods disclosed herein include tracking water pH and minerals concentration (ppm). The tracked data is used by the system for determining the exact volume and contents of the fluids that need to be added to a feeding solution for replenishing it and for reaching desired preset values. In addition, the tracked data is used for creating models that can be used for predicting changes in the feeding solution, and using the prediction for intelligent management of the feeding solution during all stages of plant growth, thereby avoiding crisis, fatal changes in the feeding solution, and hence saving funds and time in soilless plant growth.

Thus, the system and methods disclosed herein are configured to provide dynamic plant feeding based on the measured parameters.

Advantageously, the system and methods disclosed herein are configured for delicate, partial replacement of the feeding solution based on the measured data, thereby providing a cost-effective solution to the problem of soilless plant growth.

The system disclosed herein comprises various components providing sophisticated, customized, yet, user friendly, control of the parameter required for soilless gardening, including, but not limited to, nutrients, pH, feeding solution level (amount) among others. Advantageously, the system and methods disclosed herein provide selective layers of functionality, some of which can be easily operated by layman, via a simple user-friendly interface. The system provides advanced automated technology for soilless plant growing that operates in the background of the daily functions. For example, the system uses multi-sensor technology to continuously "learn" the conditions that yield best/optimal plant's growth, using the collected data for optimizing the plant growth conditions. The ability of the system to continuously, or periodically, monitor in real time the various parameters involved in plant growth and deduce the best conditions, enables to significantly reduce growth time, nutrients consumption, failure rate and fertilizer waste.

In some embodiments, there is provided a system for monitoring and maintaining a balanced plant soilless feeding solution comprising a server comprising a data bank, and a hydroponic device connected to at least one sensor, the hydroponic device comprising
  at least one microprocessor;
  at least one communication board in communication with the server;
  at least one sensor port;
  at least one sensor functionally connected to the at least one sensor port, wherein the at least one sensor configured to continuously monitor the contents of the feeding solution or the contents of fluids added or drained from the feeding solution,
  wherein each measurement performed by the at least one sensor is transferred to at least one of the server and the hydroponic device; and
  wherein the data bank is a dynamic data bank comprising data from water facilities worldwide, measurements of the feeding solution collected by the at least one sensor, values related to the contents of the feeding solution uploaded by a user uploaded by a user, values related to the location and weather of the feeding solution and values associating the contents of a feeding solution to plant strain or type.

In some embodiments, the server comprises at least one machine learning algorithm configured to predict changes in the contents of the feeding solution, based on the values stored in the data bank.

In some embodiments, the hydroponic device is a hub, and wherein the at least one sensor is configured to be dipped in the feeding solution, and monitor the contents of the feeding solution.

In some embodiments, the system comprises at least one additional module connected to the hub, and obtaining electrical power therefrom, wherein the at least one additional module comprises a microprocessor, and a communication unit, and wherein the at least one additional module is connected to at least one pump and at least one container containing a solution required for adjusting the contents of the feeding solution.

In some embodiments, the server and/or the hydroponic device include an algorithm continuously updating the system and the components thereof of the water level. The updates are based on initially data corresponding to the dimensions of the container, the volume of the feeding solution, the level (height) of the feeding solution in the container, the surface of the feeding solution, the type/strain of the plant grown in the feeding solution, the age of the plant, the size of the plant, the plant density as well as the weather, season, humidity and wind regime. Based on this information the server and/or the hydroponic device predicts rates of evaporation and consumption by the plants and continuously updates the dimensions of the feeding solution.

In some embodiments, the at least one additional module is a pH module and the at least one sensor is a pH sensor, and wherein the pH module comprises a communication unit, configured to enable communication between the pH module and at least one of the hub and the server, at least one pump configured to pump an acidic or alkaline solution to the feeding solution, wherein the operation of the at least one pump is controlled by the hub and/or the server.

In some embodiments, the pH module is fluidly connected to a plurality of containers, at least one container comprising an acidic solution and at least one container comprises an alkaline solution.

In some embodiments, the pH module comprises a plurality of pumps, wherein at least one pump is fluidly connected to the at least one container comprising the acidic solution and at least one pump is fluidly connected to the at least one container comprises the alkaline solution.

In some embodiments, the at least one additional module is a nutrient module and the at least one sensor is a nutrient sensor, and wherein the nutrient module comprises a communication unit, configured to enable communication between the nutrient module and at least one of the hub and the server, at least one pump configured to pump a solution of nutrients to the feeding solution, wherein the operation of the pump is controlled by the hub and/or the server.

In some embodiments, the nutrient module is fluidly connected to at least one container comprising the solution of nutrients.

In some embodiments, the nutrients module comprises at least one pump fluidly connected to the at least one container comprising the solution of nutrients.

In some embodiments, the nutrient sensor is an EC sensor.

In some embodiments, the nutrient sensor is a visualization unit comprising a camera or a video camera.

In some embodiments, the hydroponic device further comprises a user interface, configured to enable a user to perform one or more of: review the performance of the hydroponic device or any module connected thereto, add new commands, algorithms and software to the hydroponic device and to any of the module connected thereto, and correct errors in the operation of the hydroponic device and any of the modules connected thereto. Each possibility is a separate embodiment of the present invention.

In some embodiments, the system is further configured to adjust the feeding solution to a required feeding solution contents, by activating pumps associated with one or more of the at least one additional module.

In some embodiments, the hydroponic device is a reservoir management module, and wherein the at least one sensor port is configured to functionally connect to at least one fluid level sensor adapted to measure the fluid level of the feeding solution.

In some embodiments, the reservoir management module is fluidly connected to a plurality of conduits and corresponding valves, at least one conduit is configured to allow flow of a predetermined volume of water from a water source to the feeding solution, wherein the flow of water is controlled by a corresponding valve, and at least one conduit is configured to allow draining a predetermined volume of feeding solution, wherein the flow of draining is controlled by a corresponding valve, and wherein the predetermined volume is determined by the at least one microprocessor or by the micro-controller.

In some embodiments, each measurement performed by the at least one fluid level sensor is stored in an internal storage of the reservoir management module and stored in the server and transferred to the server, In some embodiments, the water is tap water or RO water.

In some embodiments, the flow and/or draining are enabled by gravity, once the valves controlling same, are open.

In some embodiments, the reservoir management module is further connected to at least one pump fluidly connected to at least one conduit of the plurality of conduits.

In some embodiments, the reservoir management module is fluidly connected to at least 3 conduits and corresponding valves, at least one conduit is configured to allow flow of a predetermined volume of water from a water source to the feeding solution, at least one conduit is configured to allow flow of a predetermined volume of RO water from an RO water source and at least one conduit is configured to allow draining a predetermined volume of feeding solution.

In some embodiments, the reservoir management module further comprises at least one sensor configured to measure a level of at least one component in the fluids flowing in at least one of the plurality of conduits.

In some embodiments, the at least one sensor is configured to measure the level of the at least one component in the fluids when the corresponding valve is locked, thereby enabling measurement prior to flowing into the feeding solution or prior to being drained outside the system.

In some embodiments, the at least one sensor is selected from a pH sensor, a temperature sensor, an EC sensor, a nutrient sensor, oxidation-reduction potential sensor, minerals sensor and total dissolved solids sensor.

In some embodiments, there is provided a computer-implemented method for monitoring the level of components associated with plant growth, the method comprising the steps of:
(a) providing the system disclosed herein and a soil-less system comprising plants grown in a reservoir comprising a feeding solution;
(b) measuring, a plurality of times, the level of at least one component associated with plant growth;
(c) identifying a change in the at least one component, between an early measurement to at least one later measurement;
(d) determining that the identified change requires adjusting the contents of the feeding solution, wherein said identifying and determining is carried out by at least one of the server and the hydroponic device and comprises applying database interrogation on the at least one later measurement with respect to the data bank.

In some embodiments, the method further comprising repeating steps (b) to (d) periodically.

In some embodiments, the change in the at least one component, between an early measurement to at least one later measurement refers to deviation from a predefined level of said at least one component.

In some embodiments, said measuring is performed with the at least one sensor configured to measure the level of the at least one component associated with plant growth.

In some embodiments, the at least one component is selected from the group consisting of fluid level, pH, EC, nutrient, oxidation-reduction potential, temperature, minerals and total dissolved solids.

In some embodiments, the method further comprising adjusting the feeding solution by adding at least one solution comprising a required amount of the at least one component, thereby adjusting the feeding solution to include the predefined level of said at least one component (which is at the time of adjustment also referred to as 'the current feeding solution'), wherein the volume of the added solution, the time intervals between consecutive adding and the amount of the at least one component included therein are determined by at least one of the server and the hydroponic device.

In some embodiments, said adding to the feeding solution comprising transferring from one or more containers fluids that form the added solution.

In some embodiments, said adding comprises pumping through conduits fluidly connected to at least one pump.

In some embodiments, the method further comprising adjusting the feeding solution by draining a predetermined volume of feeding solution, wherein the volume of the drained feeding solution and the time intervals between consecutive draining are determined by at least one of the server and the hydroponic device.

In some embodiments, said continuously comprises a plurality of time per second.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not to scale.

In the Figures.

DETAILED DESCRIPTION OF THE INVENTION

Figure 1A:
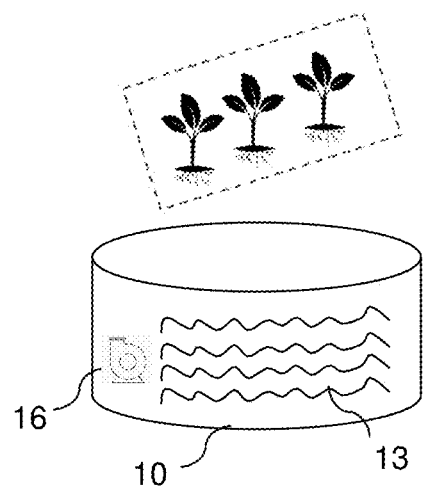
FIGS. 1A and 1B schematically describes the main principles of known soilless systems.

The principles, uses and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout. In the figures, same reference numerals refer to same parts throughout.

In the description and claims of the application, the words "include" and "have", and forms thereof, are not limited to members in a list with which the words may be associated.

Provided herein is a system and uses thereof for hydroponic gardening, configured to continuously monitor and adjust pH and nutrients level of plants soil-less growing media.

Plant feeding is an important and necessary step for normal plant growth and development. In plants grown in soil-less (such as hydroponics) conditions, the management of plant nutrition is even more important because without the added nutrients the plant may not receive all the minerals and micro-elements required for its growth, productivity and normal development.

The feeding solution in soilless systems is typically adjusted to the desired features (pH, nutrients etc.) manually using EC (ppm or ms/cm) and pH measurements and obtaining estimated values, based on comparison to generic fertilizer charts. Those charts contain non-specific dose formulas that are not based on the actual conditions of the system, such as, the environment (location, weather), chemical profile of the water that is used for making the feeding solution, the growth stage of the plant, the strain of the plant, among other important parameters. Fertilizing the plant according to the generic feeding charts, typically lead to malnutrition and waste of resources (water, fertilizers etc.)

Standard fertilization of hydroponics is usually done with fertilizers that are unique for hydroponics wherein their most prominent feature is solubility in water. There is a range of hydroponic fertilizers, with specific formulations to the various growth stages of a plant. Each fertilization solution includes a combination of minerals and micro-elements required for a plant at a certain stage of growth.

Water naturally contains salts like sodium, calcium, magnesium, bicarbonates, chlorides and sulfates in different doses, the contents of which differ from area to area on the globe. For example, total salt concentration (TDS) in drinking water (typically used for the feed solution) ranges between 0.3-2.0 ms. The presence of salts affects the electrical conductivity (EC) of water and its pH. Hence, EC measurements are typically utilized for monitoring salts contents in hydroponic growth. EC level corresponds to the overall concentration of salts dissolved in the water—the more salts are dissolved, the higher the electrical conductivity.

Excessive levels of nutrients in the water can cause an osmotic shock in the plant tissue, and may lead to ionic toxicity or nutritional imbalance. Low levels of these nutrients lead to nutritional deficiencies with side effects that can harm the development of the plant.

Figure 1B:
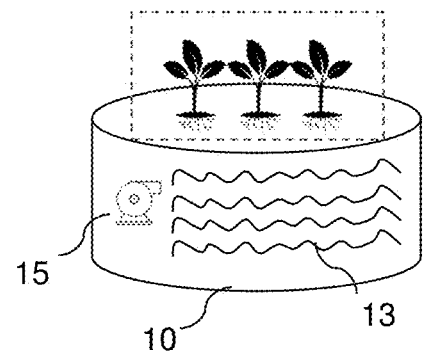

The main types of currently used hydroponic systems are NFT and DWC, schematically described in FIGS. 1A and 1B, respectively. Such system include a main reservoir 10 encompassing feeding solution 13, wherein the plant roots are immersed in a flow of feeding solution 13 flowing in a secondary channel or reservoir, that obtains the fluids from reservoir 10 (FIG. 1A) or the roots are immersed in feeding solution 13 within reservoir 10 (FIG. 1B). In order to avoid high concentrations of salts in the feeding solution it is customary to rinse the plant substrate and/or replace the feeding solution with a fresh solution, thereby leading to great waste of resources.

Another disadvantage of the existing techniques is that they rely on generic charts and EC measurements for assessing the concentration of fertilizers and nutrients in the water. This may lead to malnutrition, toxification and other damages. For example, the value of the measured soluble salts concentration in the feeding solution may be normal, yet, the solution is devoid of some specific elements that are essential for plant development which cannot be assessed by simple analysis of EC measurement.

Another drawback of existing hydroponic system is the approach used for calibration of EC. EC is commonly calibrated by dipping an EC sensor in a single calibration solution and resetting the sensor. Any measured EC value is registered and stored locally on the computer, and if the EC sensor is reset between one measurement to another, it must be calibrated again. Moreover, a single calibration step is usually not accurate and may cause deviations, particularly in measurements at low conductivity ranges. Furthermore, it is necessary to calibrate the EC sensor periodically, every few weeks, while at least the majority of the systems known to date do not have mechanism to monitor the quality of calibration and/or produce periodic alerts. Hence, non-calibrated sensors are widely used, producing erroneous measurements, leading to poor treatment of hydroponic plants.

pH calibration suffers from similar disadvantages. In hydroponic system pH is usually calibrated by dipping a pH sensor in pH 4 and 7 solutions. If the pH sensor is reset between one measurement to another, it must be calibrated again, where in most systems there are no periodic warnings or alerts to do so.

It should be noted having suitable pH levels in the root environment, i.e. in the feeding solution, allows the plant to absorb more minerals during all growth stages. Hence, maintaining the required pH, requires continuous balancing the acidity of the feeding solution water to prevent plant deficiencies. The process of pH adjustment is presently performed in two main ways:

1. Manual balance—manually measuring adding base/acid liquid, when required. Manual balancing is time consuming and is inaccurate as the pH level changes at any given moment. Thus, manual adjustment often results in an overshoot phenomenon where the user added acid/base solution in excess.
2. Balancing using an acid controller—this approach utilizes external acid and alkali solution tanks, and a target pH level set by a user often taken from public forums and not from studies relevant to a given location, its water profile, weather etc. As the reference value is usually inaccurate, an overshoot of pH typically occurs by adding irrelevant amounts of acid/base solutions.

As detailed herein, the system and methods disclosed herein enable monitoring various parameters, collecting and storing the data for further analysis, and in parallel, adjusting the parameters continuously, to maintain optimal growth conditions. Moreover, the system disclosed herein includes a database containing information obtained from numerous national (federal) reports on water contents (minerals, nutrients) worldwide, over years and their corresponding EC values, and applies database interrogation, thereby obtaining an accurate profile of any water sample measured by the system.

Some of the complicated analysis provided by the systems and methods disclosed herein, include:

1. Dynamic plant feeding technology based on tap water EC/minerals concentration (ppm) analysis. The dynamic plant feeding technology, disclosed herein, enables to calculate the amount of nutrients needed to add to a feeding solution due to changes in the total EC/ppm of the feeding solution. The technology utilizes an algorithm configured to control the measurement of minerals, EC and other components and feature of a feeding solution, and then calculate the amount and/or concentration of a mineral and/or chemical element needed to add to a feeding solution, while aggregating real time measurements of (i) the current amount and/or concentration of a mineral and/or chemical element and/or the EC level inside the feeding solution water tank, (ii) the amount of new water added and/or replaced and/or consumed and/or evaporated and/or removed, (iii) the amount and/or concentration of a mineral and/or chemical element new fluid and/or water added.

2. Feeding solution replacement/partial replacement technology and algorithm—The Feeding solution replacement/partial replacement algorithm, disclosed herein, in accordance with some embodiments, is configured to calculate the amount of water needed to add and/or remove and/or replace in the feeding solution. The algorithm is configured to measure and calculate the amount and/or concentration of a mineral and/or chemical element needed to add to a feeding solution as a function of time while aggregating real time measurements of the current amount and/or concentration of a mineral and/or chemical element inside the feeding solution water tank, the EC level of the feeding solution, the amount of new water added and/or replaced and/or consumed and/or evaporated and/or removed, the amount and/or concentration of a mineral and/or chemical element, new fluid, and/or water added.

3. Intelligent pH modeling and control algorithm for soils/hydroponics methods:
    a. Dynamic PH balance/adjustment algorithm—the Dynamic pH balance algorithm, disclosed herein, is configured to calculate and trigger the injection of the exact amount of pH increasing/reducing substances to the feeding solution in order to maintain the desired pH level of the solution, it calculates several critical chemical and physical parameters such as the amount of water inside the solution, the chemical composition of the feeding solution, the chemical composition of the pH increasing/reducing balance fluids, and the current and target pH level.
    b. Feeding solution pH changes modeling algorithm—the Feeding solution pH changes modeling algorithm, disclosed herein, in accordance with some embodiments, is configured to monitor and analyze the changes and/or changes' gradient of pH level as a function of time and creates a unique mathematical changes patterns profile. The changes in pH as a function of time can indicate the presence of hostile elements inside the feeding solutions that could harm the plant. The changes in pH as a function of time can also indicate consumption of certain minerals by the plants' roots.
    c. Flexible pH level balance algorithm for optimal plants feeding minerals absorption. For most commonly grown hydroponic crops, an optimal pH range is between 5.5 to 6.5. The optimal acidic pH range for hydroponic crops is important as it affects the solubility, availability and uptake of several of the essential plant nutrients. If the pH drifts too high (past 7), plant uptake of some nutrients becomes less efficient. For example, plants can become iron deficient, even if sufficient iron is present in the nutrient solution. Inexperienced growers may misinterpret these nutrient deficiency symptoms as a problem with the nutrient formulation or product itself, rather than an issue with pH rising above optimal levels for iron and calcium uptake. The Flexible pH level balance algorithm for optimal plants feeding minerals absorption changes the pH level of the feeding solution at a variant time interval in order to allow the absorption of an individual and/or a group of element by the plants roots, therefore, it reduces nutrients deficiencies causes by the pH level of the water.

The Intelligent pH modeling and control algorithm for soils/hydroponics systems and systems utilizing this algorithm, disclosed herein, have the following advantages (among other advantages):

The Dynamic PH balance algorithm analyses the feeding solution chemical and physical parameters; this allows precise control over the pH level of the water-without exceeding the target pH range while injecting the optimal amount of pH increasing/reducing balance fluids.

Canceling (or at least reducing) the pH overshooting effect.

Creating plant feeding profile according to the changes in pH over time.

Creating plant diseases and pesticides profile(s) according to the changes in pH over time.

Flexible pH level control offers absorption of different elements by the plant roots without adding more nutrients to the feeding solution.

Reducing the nutrients' consumption and waste.

In some embodiments, provided herein, are methods and systems for wireless water sensor calibration, for example:
    i. Cloud based water pH sensor calibration and notification algorithm;
    ii. Cloud based water EC/minerals concentration (ppm) sensor calibration.

In some embodiments, provided herein, are methods for intelligent pH modeling and control algorithm for soil-less/hydroponic growing which include:
    i. Dynamic feeding solution PH balance algorithm, methods and systems using same;
    ii. Feeding solution pH changes modeling algorithm, methods and systems using same; and
    iii. Flexible pH level balance algorithm for optimal plants feeding minerals absorption, methods and systems using same.

The terms "soilless", "soil-less" and "hydroponic" as used herein are interchangeable, and generally refer to plant growing media which is devoid of soil. The plant growing media may be solid, semi-solid and in the form of solution, preferably, aqueous solution.

Figure 2:
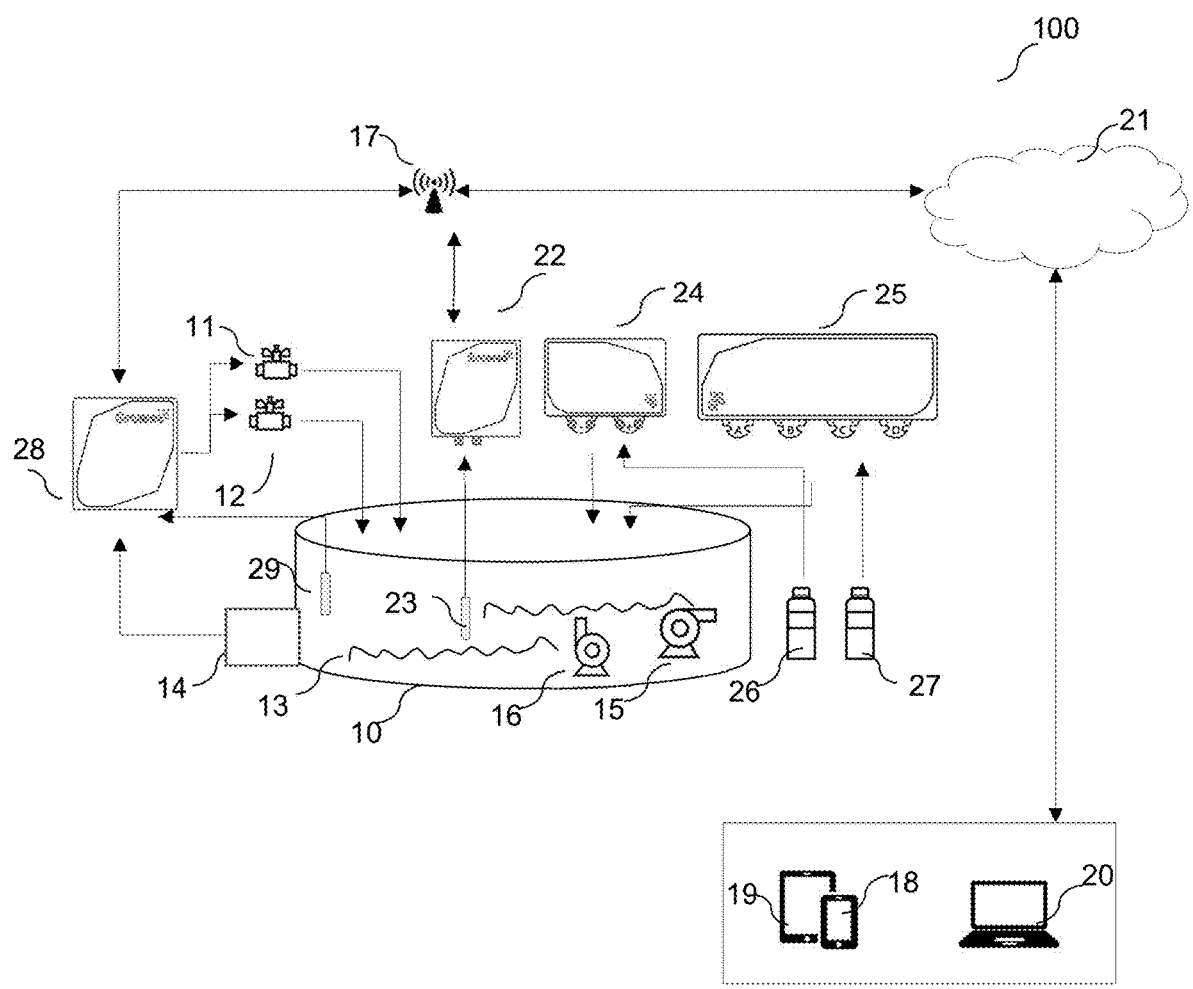
FIG. 2 schematically illustrates a soil-less system, according to some embodiments.
Figures 3A, 3B:
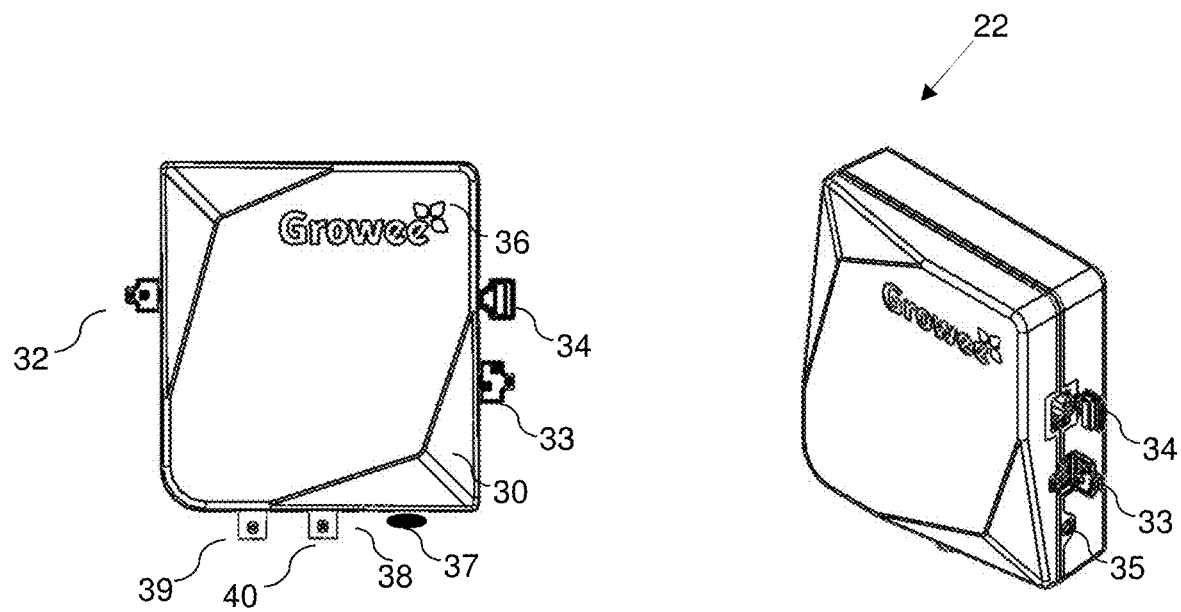
FIGS. 3A and 3B schematically illustrates front and perspective views, respectively, of a hydroponic hub, according to some embodiments.
Figure 4:
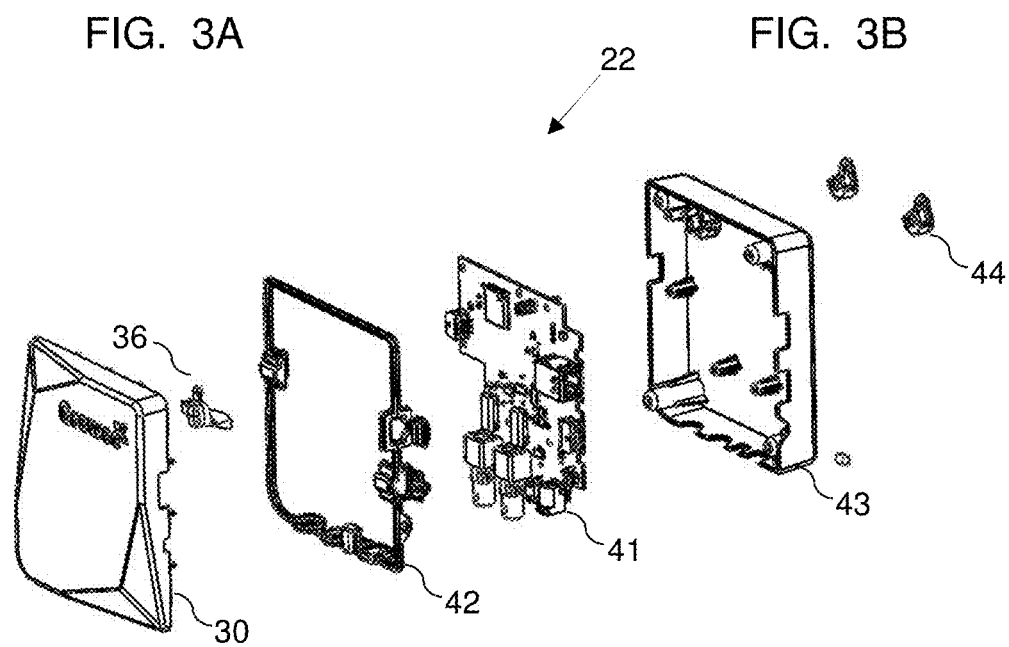
FIG. 4 schematically illustrates an exploded perspective view of a hydroponic hub, according to some embodiments.
Figure 5:
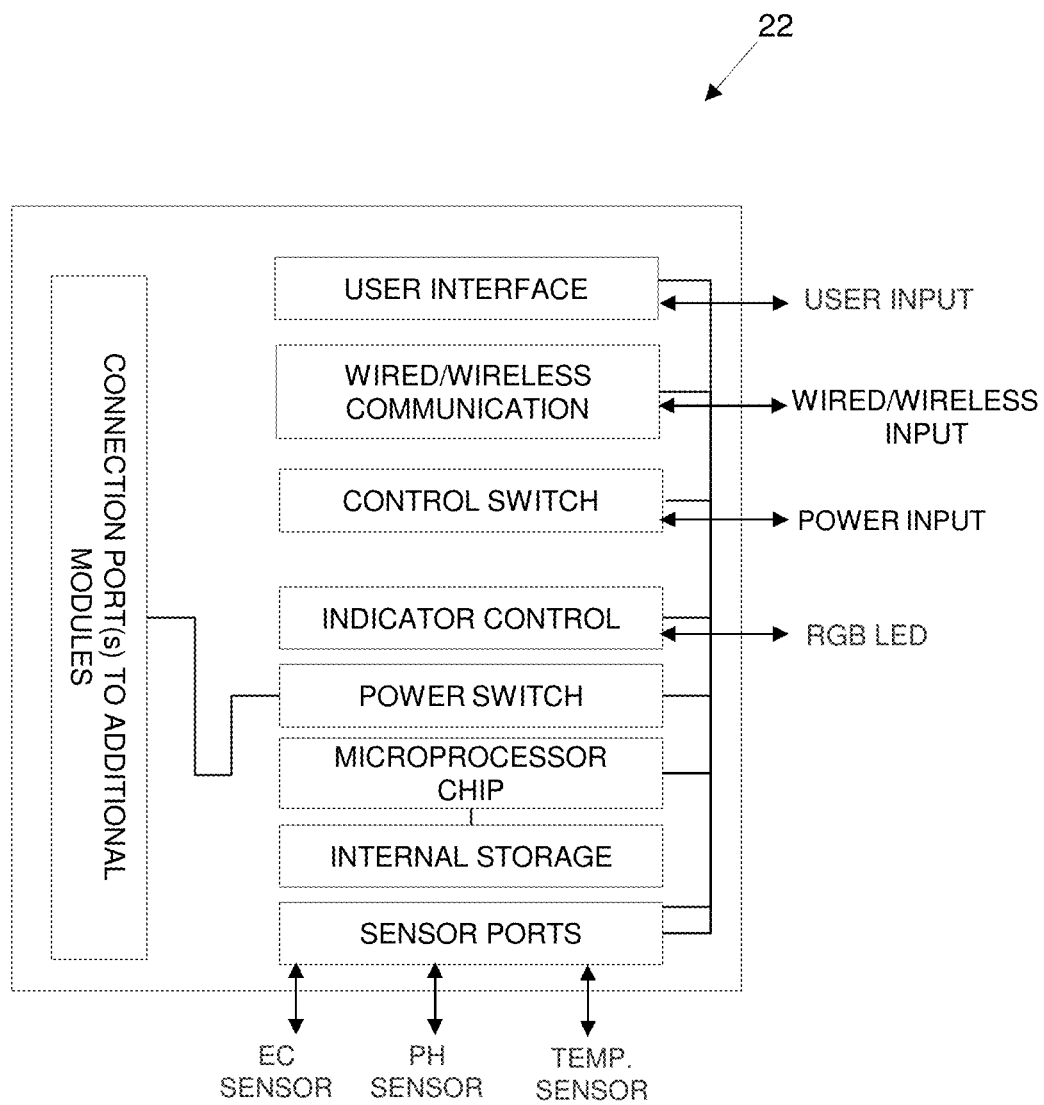
FIG. 5 presents a block diagram of some components of a hydroponic hub, according to some embodiments.
Figure 6A:
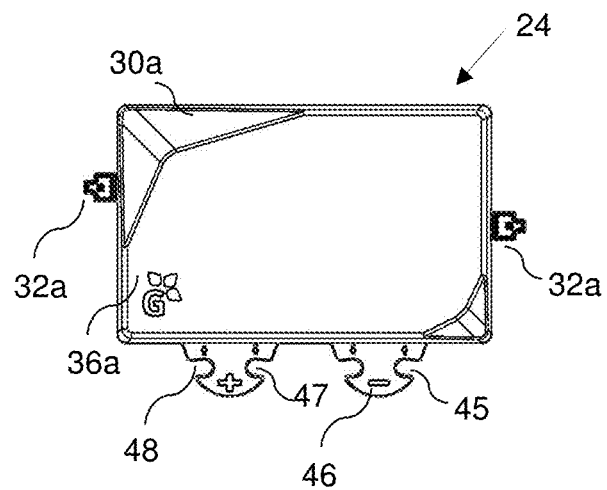
FIGS. 6A and 6B schematically illustrate front and perspective views of a pH module, according to some embodiments.
Figure 6B:
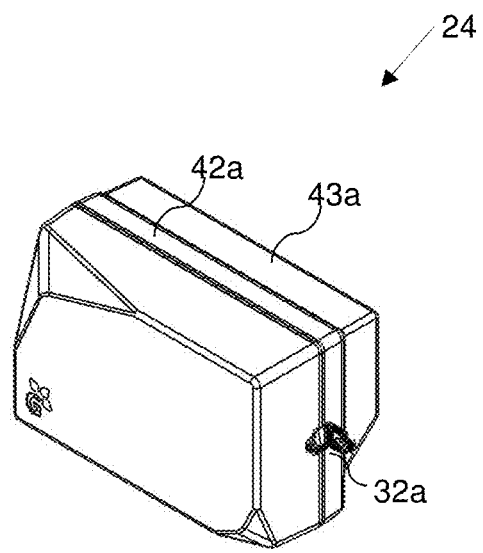
Figure 7:
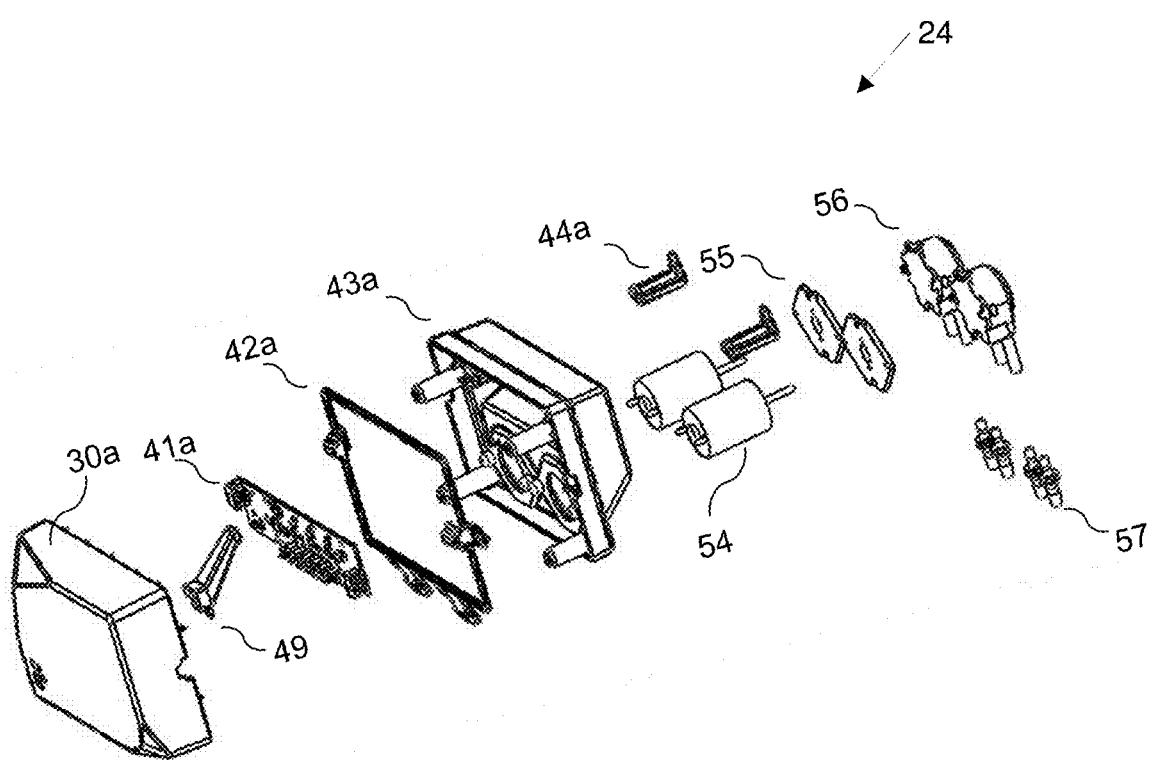
FIG. 7 schematically illustrates an exploded perspective views of a pH module, according to some embodiments.
Figure 8:
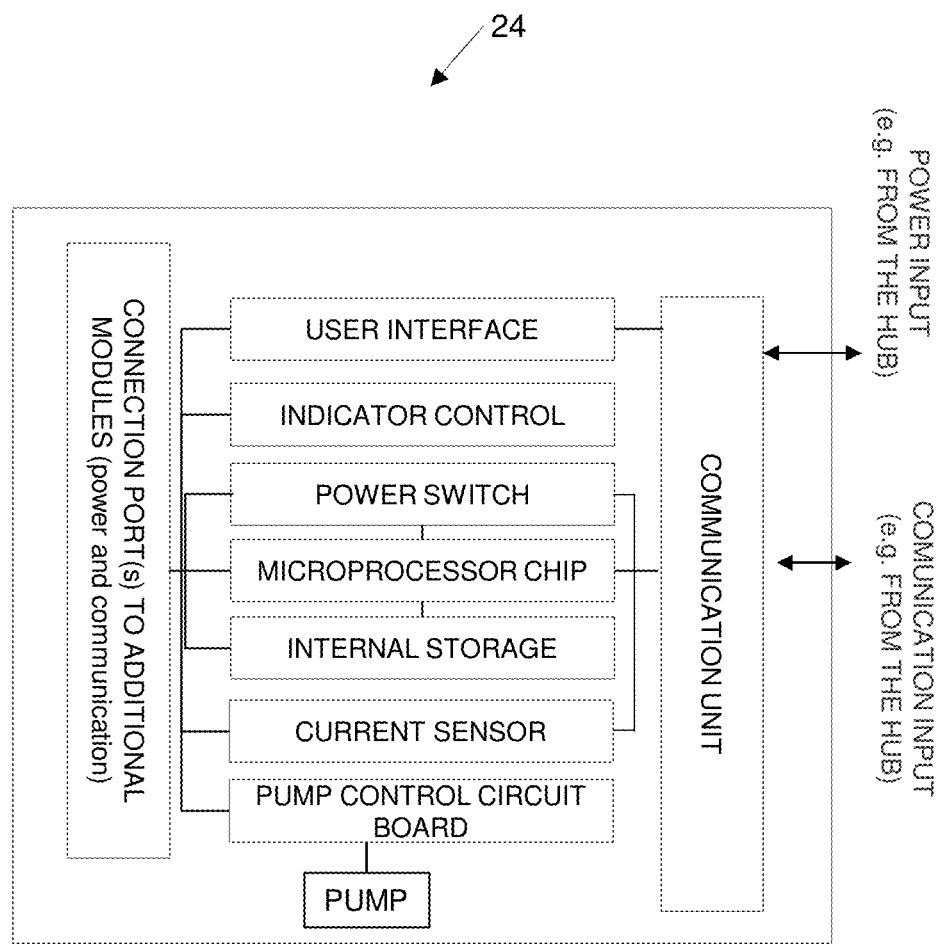
FIG. 8 presents a block diagram of a pH module, according to some embodiments.

Reference is now made to FIG. 2, which schematically illustrates, in accordance with some embodiments, a reservoir 10 comprising feeding solution 13, air pumping unit 15, liquid pumping unit 16, a sensor 23 (e.g. a temperature sensor) optionally, pH adjusting solution stored in container 26 and/or at least one nutrients solution stored in at least one container 27 and further comprising system 100 comprising hydroponic hub 22 and/or reservoir management module 28, and, optionally, any one or more of pH module 24 and nutrients module 25.

In some embodiments, system 100 comprises a hydroponic device and server 21.

In some embodiments, the hydroponic device is hydroponic hub 22 (also termed hub 22).

In some embodiments, the hydroponic device is reservoir management module 28.

System 100 is configured for being installed indoors or outdoors, and operate in a hydroponics growing environment, preferably, equipped with wireless connection facilities 17. The wireless connection may be by way of WiFi, Bluetooth or any other suitable wireless connection. The wireless connection may have access to the internet via any suitable wired or wireless network including any local area network, wide area network, Internet network, telecommunications network, 3G/4G, Wi-Fi enabled network, or Bluetooth enabled network. Each possibility is a separate embodiment of the present invention.

The wireless connection of system 100 is configured to communicate with a user, for example, through, a user device, such as, personal computer 20, smartphone 18 or the like (e.g. tablet 19). In some embodiments, system 100 further comprises server 21, wherein server 21 comprises, or associate with, storage, storage system, a data bank, operating system and processing system.

In some embodiments, the data bank comprises data collected from numerous water facilities and authorities, worldwide, reflecting the contents of water samples derived from water sources, over years, the corresponding pH, fertilizer/mineral profile and EC for each water sample. In some embodiments, the data bank is a dynamic data bank continuously enriched with values collected by the sensors of system 100 and values inserted to system 100 by users. In some embodiments, the data bank further comprises values of optimal soilless feeding solutions contents and temperature for a variety of environments, water and plants.

In some embodiments, the data acquired by the sensors of system 100 and/or by users thereof, is stored in server 21. Hence, server 21 is configured to store data acquired, and provided by, system 100.

In some embodiments, server 21 is within a cloud-based computing environment. In some embodiments, server 21 is tangible, namely, a physical device or component in a computing system that receives and retains information from system 100 or from a user of the system. The server may be internal to a computing device, such as a computer's hard drive, or a removable device, such as, an external hard drive or universal serial bus (USB) flash drive.

In some embodiments, server 21 comprises at least one machine learning algorithm configured to predict changes in the contents of the feeding solution, based on the values stored in the data bank. In some embodiments, server 21 is configured to continuously adjust, in real time, the contents of the feeding solution based on predictions performed by the at least one machine learning algorithm, by operating one or more modules connected to system 100. In some embodiments, wireless communication of system 100 is between hub 22, server 21 and personal device(s) of the user (e.g. smartphone, iPad or PC) and/or between hub 22 and server 21, as detailed below.

In some embodiments, system 100 further comprises reservoir management module 28 fluidly connected to reservoir 10 through valves 11, 12, 14, as detailed below with reference to FIG. 11.

In some embodiments, system 100 further comprises at least one of pH module 24 and nutrient module 25.

Reference is now made to FIGS. 3A, 3B, 4 and 5 which schematically illustrate, in accordance with some embodiments, hub 22. Hub 22 comprises a circuit board 41. In some embodiments, circuit board 41 is a microprocessor chip. In some embodiments, circuit board 41 comprises a microcontroller. In some embodiments, hub 22 comprises a communication unit 34. In some embodiments, circuit board 41 communicates with communication unit 34. Alternatively, communication between hub 22 and/or circuit board 41 and other components of system 100 is afforded by communication unit 34.

Communication between hub 22 and communication unit 34 is required for various activities, including, but not limited to, transfer of data collected by hub 22 to storage, such as, server 21, through communication unit 34, collection and transfer of data from one or more sensors connected to hub 22 to server 21, collection a transfer of data from one or more modules connected to hub 22 to server 21, for further analysis and processing of data, and the like.

In some embodiments, communication unit 34 is a wireless communication unit. In some embodiments, communication unit 34 comprises a plurality of wireless communication units. In some embodiments, the wireless communication unit comprises wireless communication circuitry compatible with one or more wireless communication protocols, such as Wi-Fi, ZigBee, Bluetooth and wireless local area network (LAN). Each possibility is a separate embodiment of the present invention. In some embodiments, communication unit 34 is an Ethernet port configure to connect the hub 22, through a cable, to a network.

In some embodiments, hub 22 comprises control switch 35 also termed on/off switch, configured to turn on/off hub 22, or the activity of hub 22. In some embodiments, control switch 35 is functionally connected to power port 37 wherein hub 22 is connected to electricity or to a power supply through power port 37. In some embodiments, the power supply comprises one or more batteries. In some embodiments, the power supply is a solar power supply.

The term "functionally connected to" is synonymous to the term "functionally associated with" and includes indirect connection between two or more elements, e.g. via one or more other elements, non-physical connection between two or more element, e.g. through wireless communication, and also include physical connection between two or more elements.

In some embodiments, control switch 35 is functionally associated with circuit board 41. In some embodiments, control switch 35 is functionally associated with a switch control component functionally associated with circuit board 41. In some embodiments, control switch 35 is configured to initiate the activity of hub 22. In some embodiments, control switch 35 is configured to reset hub 22. Resetting hub 22, may be required under various circumstances, such as, loss of wireless communication and electricity failure. The term "reset" in the context of control switch 35 is exchangeable with the term restart.

In some embodiments, hub 22 comprises a least one power switch 32, configured to connect/disconnect additional module(s) to hub 22, such as, pH module 24 and nutrients module 25. Power switch 32 is configured to supply power (electricity) to the additional module connected to hub 22.

In some embodiments, hub 22 comprises hub front cover 30, hub back cover 43 and gasket 42, wherein gasket 42 fills the space between hub front cover 30 and hub back cover 43 when they attach to one another in order to house (hold together) all the component of hub 22. In some embodiments, hub front cover 30, hub back cover 43 and gasket 42, form a sealed structure.

A "sealed structure" as used herein generally indicates that front and back covers of any of the modules and components describe herein, optionally with a gasket, when joined together prevent anything from passing between them, thus protecting, at least partially, the components within the sealed cover from exposure to humidity and smoke, among others.

In some embodiments, hub back cover 43 comprise screw ports configured to enable mounting hub 22 onto a solid surface, e.g. a wall, using screws, such as, screws 44.

In some embodiments, hub 22 comprises indicator 36 configured to provide visual and/or auditory signals under various circumstances, based on signal/instructions received from circuit board 41. In some embodiments, indicator 36 receives instructions/signal from an indicator control component, located within, or functionally associated with, circuit board 41. For example, indicator 36 may provide blinking red light when one of the sensors, e.g. the pH or the ORP sensors detect a suboptimal value. More generally, indicator 36 may be used for producing visual and/or auditory signals in response to one or more status codes or error codes, including, but not limited to, low power of system 100 or components thereof, such as, hub 22. The signals may be visual signals, blinking and/or different colors, where each distinct signal indicates a specific status or error. In some embodiments, indicator 36 comprises LED light source. In some embodiments, indicator 36 is positioned on the front face of hub front cover 30, thereby a user can easily view or here the indications produced by indicator 36.

In some embodiments, hub 22 comprises a plurality of sensors. In some embodiments, hub 22 comprises one or more sensors selected from the group consisting of pH sensor, temperature sensor, EC sensor, oxidation-reduction potential (ORP) sensor, minerals sensor and total dissolved solids (TDS) sensor. Each possibility is a separate embodiment of the present invention.

Any sensor known in the art can be employed in the context of system 100 for providing the required measurements.

In some embodiments, the mineral sensor comprises a plurality of sensor each sensor configured to sense at least one compound (e.g. Calcium, ammonium, sodium) or at least one composition of compounds comprising specific compounds at specific concentrations.

In some embodiments, hub 22 comprises a temperature sensor port 38, configured to connect to a temperature sensor. In some embodiments, hub 22 comprises a temperature sensor configured to connect to hub 22 through port 38, and further configured to measure temperature of a feeding solution.

In some embodiments, the temperature sensor is selected from an RTD (resistance temperature detector), thermometer and thermocouple. Each possibility is a separate embodiment of the present invention.

In some embodiments, hub 22 further comprises a pH sensor port 39 configured to connect to a pH sensor. In some embodiments, hub 22 comprises a pH sensor configured to connect to hub 22 through port 39, and further configured to measure the pH of a feeding solution.

The term "pH sensor" as used herein refers to any sensor configured to measure pH, such as, an electrochemical pH sensor, including, combination electrochemical pH sensors having both a measuring electrode detecting changes in the pH value and a reference electrode which provides a stable signal for comparison.

In some embodiments, hub 22 may further comprises at least one port selected from oxidation-reduction potential (ORP) port (not shown) configured to functionally connect to at least one ORP sensor, electrical conductivity (EC) port (not shown) configured to functionally connect to at least one EC sensor, total dissolved solids (TDS) port 40 configured to functionally connect to at least one TDS sensor. Each possibility is a separate embodiment of the present invention.

In some embodiments, hub 22 comprises at least one port selected from an ORP sensor configured to connect to hub 22 through an ORP port, and further configured to measure the ORP of a feeding solution; an EC sensor configured to connect to hub 22 through an EC port, and further configured to measure the EC of a feeding solution; and a TDS sensor configured to connect to hub 22 through TDS port 40, and further configured to measure the TDS of a feeding solution. Each possibility is a separate embodiment of the present invention.

In some embodiments, the EC sensor is used as a nutrient sensor. The EC sensor collected EC data which is analyzed by hub 22 based on data stored in storage 21 which includes numerous EC values for water with different types of minerals (nutrients and fertilizers) at various concentrations. The analysis includes (i) selecting the best fit between an EC value measured in a feeding solution and an EC value, or a plurality of values from the data bank stored in storage 21, (ii) deducing the nutrients contents of the feeding solution corresponding to the measured EC value, (iii) deciding the type of nutrient or nutrient formulation, and the amount or concentration thereof, that has to be added to the feeding solution in order to adjust it to the required/desired nutrient profile; (iv) instructing nutrient module 25 to supplement a feeding solution with said type of nutrient or nutrient formulation and said amount/concentration thereof.

The term "best fit" as used herein refers to a statistical outcome obtained from comparing a measured parameter, range, or group of parameters (such as, EC value) to a database or a data bank of parameters and their corresponding identity (e.g. a database of EC values of water samples and the corresponding contents of nutrients in each water sample sample), aiming to assign a value, or range, of identities that is/are most similar to the measured parameters. This type of analysis is often referred to as database interrogation and best fit may be synonymous, according to some embodiments, to a high probability score. A high probability score reflects the probability that the measured parameter is having, or closely correlates to, a specific identity. For example, a high probability score reflects that a given measured EC corresponds to a particular water contents, having a specific content of minerals.

In some embodiments, hub 22 comprises a nutrient sensor comprising a visualization unit, such as a camera, which records the plants dimension, color, leaf texture and other physical/external characteristics of the plant. The data is collected and analyzed by hub 22, based on which addition of nutrients from container(s) 27 to a feeding solution, is carried out (or not). The analysis includes comparing the data (one or more images, or videos) obtained from the nutrient sensor to data stored in server 21 which includes numerous images and videos of plants at various conditions and the corresponding feeding solution used for the recorded plants. The analysis further includes (i) selecting the best fit between the data measured by the nutrient sensor and an image, a video, a plurality of images, or videos from the data bank stored in sever 21, (ii) deducing the nutrients contents of the feeding solution corresponding to the data obtained from the nutrient sensor, (iii) deciding the type of nutrient or nutrient formulation, and the amount or concentration thereof, that has to be added to the feeding solution in order to adjust it to the required/desired nutrient profile; (iv) instructing nutrient module 25 to supplement a feeding solution with said type of nutrient or nutrient formulation and said amount/concentration thereof.

In some embodiments, the camera is a video camera.

In some embodiments, server 21 comprises at least one image analysis algorithm, and wherein said deducing the nutrients contents of the feeding solution corresponding to the data obtained from the nutrient sensor comprises applying the at least one image analysis algorithm.

In some embodiments, server 21 is continuously trained by applying the at least one machine learning algorithm (such as, but not limited to, decision trees, boosting, support-vector machines, neural networks, nearest neighbor algorithms, Naive Bayes, bagging, random forests, etc.) to the collected data measured by the nutrient sensor or any other sensor of system 100.

In some embodiments, hub 22 comprises a user interface 33 configured to enable a user to review the activities of hub 22, revise the activities of hub 22, add activities to hub 22 and detect errors in the operation of hub 22. In some embodiments, the user is a layman, a software engineer, a programmer, computers' technician, and an engineer. Each possibility is a separate embodiment of the present invention.

User interface 33 is configure to enable a user, such as a programmer or a software engineer and other user with the required professional and technical skills, but not necessarily, perform at least one of the activities selected from: review the performance of hub 22, add new commands, algorithms and software to hub 22, and identify and correct errors in the operation of hub 22. Each possibility is a separate embodiment of the present invention. Similarly, through user interface 33 the user can review the performance of any module which is connected an controlled by hub 22, such as, pH module and nutrients module, can manipulate the activities of the other modules and can further identify and correct errors in the operation of the other modules.

In some embodiments, circuit board 41 of hub 22 comprises an internal storage, or is associated with an internal storage, configured for storage of data collected from the one or more sensors attached to hub 22. The values measure by the various sensors include parameters and functions required for the activity and operation of hub 22. In some embodiments, circuit board 41 comprises an algorithm converting measured values collected by the one or more sensors, and stored in the internal storage, to the corresponding parameter (e.g., converting mV values measured by the pH sensor to pH values).

In some embodiments, hub 22 is configured to transfer the measured values collected by the one or more sensors to server 21 wherein server 21 comprises an algorithm converting the measured values to the corresponding parameter.

In some embodiments, the internal storage is configured for storage of definitions of the dimensions of container 10 and feeding solution 13 at the initial stage obtained by a user.

In some embodiments, hub 22 is configured to collect, store and transfer to server 21 the data obtained from the measurements performed by the one or more sensors attached thereto through corresponding ports (temperature, pH, EC, TDS etc.) and from the one or more modules connected thereto, namely, hub 22 is configured to monitor, in real time, various feature related to a feeding solution, when system 100 is connected to reservoir 10 containing feeding solution 13. Hub 22 is further configured to transmit part or all of the data collected by the sensors connected thereto, to server 21. In addition, a user may communicate with hub 22 via the internet connected to a personal computer 20, smartphone 18 or any other appropriate device for reviewing the data collected by the sensors.

Reference is now made to FIGS. 6A, 6B, 7 and 8 which illustrate components of pH module 24. pH module 24 comprises front cover 30a, back cover 43a, and gasket 42a, wherein gasket 42a fills the space between front cover 30a and back cover 43a when they attach to one another in order to house (hold together) all the component of pH module 24. In some embodiments, front cover 30a, back cover 43a and gasket 42a, form a sealed structure.

In some embodiments, back cover 43a comprise screw ports configured to enable mounting pH module 24 onto a solid surface, e.g. a wall, using screws, such as, screws 44a.

In accordance with some embodiments, pH module 24 comprises a circuit board 41a. In some embodiments, circuit board 41a is a microprocessor chip. In some embodiments, circuit board 41a comprises, or associates with, pump control circuit board.

In some embodiments, pH module 24 comprises a communication unit, such as, communication unit 34. In some embodiments, the communication unit of pH module 24 communicates with hub 22, and obtains therefrom commands. The commands obtained from hub 22 are directed to release of an acidic or an alkaline solution (collectively termed 'adjusting solution) to a feeding solution, such as feeding solution 13 in reservoir 10, in order to adjust the pH of the feeding solution to a pH determined by hub 22.

In some embodiments, the communication unit of pH module 24 communicates with server 21, and obtains therefrom commands.

In some embodiments, the commands obtained from hub 22 and/or from server 21 specify adjustment regimen.

The term 'adjustment regimen' as used herein refers to the type of adjusting solution, the volume of adjusting solution, the time intervals between subsequent additions of a volume of adjusting solution and combinations thereof. The type of adjusting solution may be in the form of a brand name, pH value, concentration of active agent (e.g. acid, base, nutrient, mineral, fertilizer), pump, pump number, color of container containing the solution, color of solution and any other property that identifies the solution.

In some embodiments, circuit board 41a communicates with the communication unit of pH module 24. Alternatively, communication between pH module 24 and/or circuit board 41a and other components of system 100, in particular, hub 22 and server 21 is afforded by the communication unit.

In some embodiments, pH module 24 is associated with at least one pump, also termed hereinafter pH pump, configured to pump acidic/alkaline solution from container(s)

26 to a feeding solution, such as, feeding solution 13 when system 100 is connected thereto.

The term 'pump' as used herein refers to any type of pump that is suitable for system 100 and its components. Any of the pumps disclosed herein is connected to at least one of pump current sensor and pump control circuit board, which perform at least one of the following activities: monitor the operation of the pump, adjust the operation of the pump, send alert to a user in case the pump operation is damaged, store the amount of liquids pumped in and out by the pump and transfer to hub 22 or server 21 data related to the operation and function of the pump. Each pump includes a motor and a head, connected to conduits/tubes/pipes configured to pump in/out fluids. Accordingly, each pump further associates with valves (such as mechanical or electronic valves) to control the flow of the pumped fluids.

It is to be understood that system 100 and its components are independent, and not an integral part, of any feeding solution and/or a container comprising a feeding solution. Thus, when stated herein that the components of system 100 measure parameters related to a feeding solution, it is intended to state that such measurements are carried out, or can be carried out, when system 100 is coupled, or associated with, a given feeding solution.

In some embodiments, pH module 24 comprises at least one pump. It is to be understood that association of pH module 24 with the at least one pH pump, or encompassing at least one pump, means that certain components of the at least one pH pump are housed within pH module 24 and/or are linked to components of pH module 24 which operate (turn on/off) the at least one pH pump. In some embodiments, the at least one pH pump is a peristaltic pump. In some embodiments, pH module 24 controls the operation of the at least one pH pump. In some embodiments, pH module 24 comprises the motor of the at least one pump. In some embodiments, pH module 24 comprises the eccentric rotor of a peristaltic pump.

In some embodiments, pH module 24 is associated with a plurality of pH pumps, wherein at least one pH pump is configured to pump acidic solution from container 26*ac* (not shown) to a feeding solution, such as, feeding solution 13, and at least one pH pump is configured to pump basic solution from container 26alk (not shown) to a feeding solution, such as, feeding solution 13.

In some embodiments, pH module 24 comprises indicator 36*a* configured to provide visual and/or auditory signals under various circumstances, based on signal/instructions received from circuit board 41*a*. In some embodiments, indicator 36*a* receives instructions/signal from an indicator control component, located within, or functionally associated with, circuit board 41*a*. For example, indicator 36*a* may provide blinking red light when the pH detected by pH sensor is at a suboptimal value. In some embodiments, indicator 36*a* comprises LED light source. In some embodiments, indicator 36*a* is positioned on the front face of hub front cover 30*a*, such that, the indications produced thereby can be viewed or heard.

In some embodiments, at least one pH pump is an acid pH pump encompassing a tube (not shown) having one end dipped in container 26*ac* and another end close to the surface of feeding solution 13, wherein pH module 24 controls the operation of said acid pH pump. In some embodiments, the one end of the tube dipped in container 26*ac* is clipped, fixed, passes through, or otherwise held, by acid in-clasp 45 and the other end of the tube dipped in container 26*ac* is clipped, fixed, passes through, or otherwise held, by acid out-clasp 46.

It is to be understood that none of the tubes/conduits used for adding fluids to the feeing solution are immersed or dipped inside the feeding solution. The end of such tubes/conduits are in close proximity to the surface of the feeding solution and pour (or drip or the like) the fluids onto the feeding solution.

In some embodiments, at least one pH pump is a basic (alkaline) pH pump encompassing a tube having one end dipped in container 26alk and another end in close proximity to the surface of the feeding solution 13, wherein pH module 24 controls the operation of said basic pH pump. In some embodiments, the one end of the tube dipped in container 26alk is clipped, fixed, passes through, or otherwise held, by alk in-clasp 47 and the other end of the tube dipped in container 26alk is clipped, fixed, passes through, or otherwise held, by alk out-clasp 48.

The term "tube" as used herein generally refers to any a hollow wire, channel, pipe, duct and the like, capable of transferring fluids. In some embodiments, the tube is flexible and is adjusted to being compressed during operation (pumping) of fluids from containers, e.g. 26, 26*ac*, 26alk, 27, to the feeding solution. Optionally, each of the tubes disclosed herein is connected to other part of the pump associated therewith, or the system 100 through one or more barb connectors 57.

In some embodiments, the at least one pump associated with pH module 24 comprises one or more motors functionally connected to a pump head, wherein the pump or components thereof may be mounted, or otherwise connected, to the at least one pump through one or more mounting elements 55 which may attach the pump, to back cover 43*a*.

Any motor pumps known in the art may be suitable, including, but not limited to, rachet motor, DC motor, servo motor, step motor.

In some embodiments, the at least one pump associated with pH module 24 comprises one or more DC motor 54 functionally connected to peristaltic pump head 56, wherein the pump or components thereof may be mounted, or otherwise connected, to the at least one pump through one or more mounting elements 55 which may attach the pump, to back cover 43*a*. In some embodiments, each DC motor 54 is functionally connected and controlled, and optionally, powered, by circuit board 41*a* of pH module 24. In some embodiments, each DC motor 54 is functionally connected and controlled, and optionally, powered, by pump control circuit board of pH module 24.

In some embodiments, pH module 24 comprises a pump control circuit board, adapted to control the operation of the at least one pump. In some embodiments, the pump control circuit board is activated by circuit board 41*a* of pH module 24. In some embodiments, the pump control circuit board is activated by circuit board 41 of hub 22.

In some embodiments, pH module 24 comprises a pump current sensor adapted to continuously monitor the performance of the at least one pump, detect malfunction (such as, lack or low contents of solution(s) in the container(s), electrical failure, and/or disconnected valves) and accordingly transfer an alert to hub 22 and/or server 22, which may communicate with the user. The alert details the failure, and may include instructions to the user (e.g. to replace an empty container etc.). Alternatively, the hub 22 and/or server 22 may handle the malfunction. For example, when the malfunction is reduced functionality of a certain pump, may revise the operation of that pump for example, change the pulse-width modulation, and in parallel may induce an alert to a user to replace the problematic pump.

In some embodiments, the at least one pump is powered by pH module 24 which in turn obtains power from hub 22. In some embodiments, the at least one pump is connected to a power source and is independently powered, In some embodiments, pH module 24 comprises a plurality of power switch 32a, wherein at least one power switch 32a is configured to connect/disconnect pH module 24 to/from hub 22 and at least another power switch 32a is configured to connect pH module 24 to another module, such as, nutrient module 25.

In some embodiments, pH module 24 comprises control switch (not shown) also termed on/off switch, configured to turn on/off pH module 24, or the activity of pH module 24. In some embodiments, the control switch is functionally associated with circuit board 41a. In some embodiments, the control switch is functionally associated with a switch control component functionally associated with circuit board 41a.

In some embodiments, pH module 24 comprises user interface configured to enable a user to review the activities of pH module 24, revise the activities of pH module 24, add activities to pH module 24 and detect errors in the operation of pH module 24. Each possibility is a separate embodiment of the present invention.

In some embodiments, pH module 24 comprises an internal storage associated with the microprocessor thereof, configured for storage of data related to the operation of pH module 24. In some embodiments, the data related to the operation of pH module 24 comprises data acquired by the current sensor, properties of the solution stored in container(s) 26, amount of the solution stored in container(s) 26 which has been pumped through the at least one pH pump to feeding solution 13, function of the at least one pH pump.

In some embodiments, the data acquired by the current sensor comprises current failure. In some embodiments, the current failure data is transmitted to any one or more of hub 22 and server 21 which in turn fix the failure and/or produce an alert to a user.

Fixing the failure may include resetting pH module 24 and/or restoring connection of pH module 24 to hub 22, among other procedures.

In some embodiments, the solution stored in container(s) 26 is an acid solution and the properties of the solution comprise any one or more of volume of the solution stored in container(s) 26, pH, active agent (e.g. HCl), concentration, manufacturer and brand name. Each possibility is a separate embodiment of the present invention.

In some embodiments, the solution stored in container(s) 26 is an alkaline solution and the properties of the solution comprise any one or more of pH, active agent (e.g. NaOH), concentration, manufacturer and brand name. Each possibility is a separate embodiment of the present invention.

In some embodiments, hub 22 is configured to transfer the measured values collected by the one or more sensors to server 21 wherein server 21 comprises an algorithm converting the measured values to the corresponding parameter.

In some embodiments, the amount of the solution stored in container(s) 26 comprises any one or more of volume, concentration, amount of active agent, and combinations thereof.

In some embodiments, the internal storage is configured for storage of definitions of the dimensions of container 10 and feeding solution 13 at the initial stage obtained by a user.

In some embodiments, pH module 24 comprises a current sensor configured to monitor the connection pH module 24 of to the power obtained from hub 22. In some embodiments, upon loosing connection to power, indicator 36a produced an audible or visible signal.

Figure 9A:
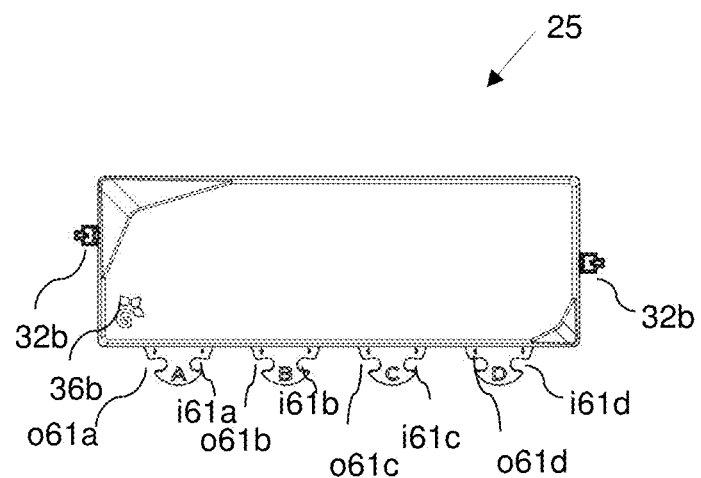
FIGS. 9A and 9B schematically illustrate front and perspective views of a nutrients module, according to some embodiments.
Figure 9B:
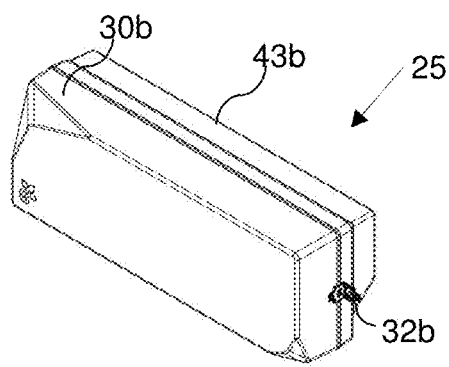

Reference is now made to FIGS. 9A, 9B, which illustrate components of nutrients module 25.

The term "nutrient" as used herein is exchangeable with mineral, and refers to additives which improve plants health, growth, yield, resistance to pathogens and the like. Typically, nutrients are supplied to plants by the soil. Such nutrients include, but are not limited to, nitrogen, phosphorus, potassium, calcium, magnesium, sulfur, iron, manganese, boron, molybdenum, copper, zinc, chlorine, and cobalt. The nutrient solution disclosed here may contain various nutrients, fertilizers and minerals, as different ratios/quantities. Alternatively, the nutrient solution refers to a plurality of nutrient solutions, each containing one or more nutrients, or mixture of nutrients. The type of nutrient solution, amount, timing and all other parameters related to use of each of the nutrient solution is determined by hub 22 and/or server 21. Stated otherwise, the 'decision' of nutrient module 25 regarding the addition of nutrients to a feeding solution, is made by hub 22 and/or server 21.

In some embodiments, the communication between hub 22 and nutrient module 25 is though the communication unit of hub 22 and the communication unit located within nutrient module 25. In some embodiments, the communication between server 21 and nutrient module 25 is though a communication unit of server 21 and the communication unit located within nutrient module 25. The communication between hub 22, server 21 and nutrient module 25 includes transfer of commands from the former to the latter.

In some embodiments, the commands obtained from hub 22 and/or from server 21 specify adjustment regimen.

In some embodiments, nutrient module 25 comprises a current sensor configured to monitor the connection nutrient module 25 of to the power obtained from hub 22. In some embodiments, upon loosing connection to power, indicator 36b produced an audible or visible signal.

In some embodiments, nutrient module 25 comprises an internal storage associated with the microprocessor thereof, configured for storage of data related to the operation of nutrient module 25. In some embodiments, the data related to the operation of nutrient module 25 comprises data acquired by a current sensor, data acquired by one or more nutrient sensor connected to corresponding port(s) in hub 22, properties of the solution stored in container(s) 27, amount of the solution stored in container(s) 27 which has been pumped through the at least one nutrient pump to feeding solution 13, function of the at least one nutrient pump.

In some embodiments, the data acquired by the current sensor comprises current failure. In some embodiments, the current failure data is transmitted to any one or more of hub 22 and server 21 which in turn fix the failure and/or produce an alert to a user.

Fixing the failure may include resetting nutrient module 25 and/or restoring connection of nutrient module 25 to hub 22, among other procedures.

In some embodiments, the properties of the solution stored in container(s) 27 comprise any one or more of nutrient composition, concentration of each nutrient in the nutrient composition, volume of nutrient solution in each of container 27, manufacturer and brand name. Each possibility is a separate embodiment of the present invention.

In some embodiments, the internal storage is configured for storage of definitions of the dimensions of container 10 and feeding solution 13 at the initial stage obtained by a user.

Nitrogen is one of the most essential elements in the vegetative growth stage of the plant, and the addition of nitrogen-rich fertilizers tend to change the pH level in the growth medium. Therefore, in the growth phase it is particularly important to monitor and control the pH level in the growth medium in parallel to monitoring nutrient/fertilizer/mineral levels.

Nutrient module 25 comprises front cover 30b, back cover 43b, and optionally, a gasket (not shown), wherein when attached to one another house (hold together) all the component nutrient module 25. Optionally, the housing formed is sealed.

In some embodiments, back cover 43b comprise screw ports configured to enable mounting nutrient module 25 onto a solid surface, e.g. a wall, using screws.

In accordance with some embodiments, nutrient module 25 comprises a circuit board (not shown). In some embodiments, the circuit board is a microprocessor chip. In some embodiments, the circuit board comprises, or associates with, nutrient pump control circuit board.

In some embodiments, the circuit board of nutrient module 25 communicates with the communication unit of nutrient module 25. Alternatively, communication between nutrient module 25 and/or its circuit board and other components of system 100, in particular, hub 22 is afforded by the communication unit.

In some embodiments, the communication unit of nutrient module 25 communicates with hub 22, and obtains therefrom commands. The commands obtained from hub 22 are directed to release of any one or more of nutrient solution(s) to a feeding solution, such as feeding solution 13 in reservoir 10, in order to adjust the nutrient profile of the feeding solution to a nutrient profile assigned by hub 22.

In some embodiments, nutrient module 25 is associated with at least one pump, also termed hereinafter nutrient pump, configured to pump nutrient solution from container(s) 27 to a feeding solution, such as, feeding solution 13.

It is to be understood that association of nutrient module 25 with the at least one nutrient pump means that certain components of the at least one nutrient pump are housed within nutrient module 25 and/or are linked to components of nutrient module 25 which operate (turn on/off) the at least one nutrient pump. In some embodiments, the at least one nutrient pump is a peristaltic pump. In some embodiments, nutrient module 25 controls the operation of the at least one nutrient pump. In some embodiments, nutrient module 25 comprises the motor of the at least one pump. In some embodiments, nutrient module 25 comprises the eccentric rotor of a peristaltic pump.

In some embodiments, nutrient module 25 is associated with at least one pump configured to pump a nutrient solution from container 27 to a feeding solution, such as, feeding solution 13. In some embodiments, nutrient module 25 is associated with a plurality of nutrient pumps, each nutrient pump is configured to pump a nutrient solution from one of containers 27 to a feeding solution, such as, feeding solution 13.

In some embodiments, nutrient module 25 comprises a pump control circuit board, adapted to control the operation of the at least one pump or at least one pump in the plurality of pumps. In some embodiments, the pump control circuit board is activated by circuit board 41b of nutrient module 25. In some embodiments, the pump control circuit board is activated by circuit board 41 of hub 22.

In some embodiments, the at least one pump is powered by pH module 24 which in turn obtains power from hub 22.

In some embodiments, the at least one pump is connected to a power source and is independently powered, In some embodiments, nutrient module 25 comprises indicator 36b the characteristics and definitions of which are similar to those of indicators 36 and 36a and are adjusted to nutrients/fertilizers/minerals, where applicable.

In some embodiments, each nutrient pump includes a tube having one end dipped in one of containers 27 and another end in close proximity to the surface of the feeding solution 13, wherein nutrient module 25 controls the operation of said pump. In some embodiments, the one end of the tube dipped in one of containers 27 is clipped, fixed, passes through, or otherwise held, by in-clasp i61a, i61b, i61c or i61d and the other end of the tube is clipped, fixed, passes through, or otherwise held, by the corresponding out-clasp o61a, o61b, o61c or o61d.

In some embodiments, nutrient module 25 comprises power switch 32b, configured to connect/disconnect nutrient module 25 from system 100, and/or form hub 22.

In some embodiments, nutrient module 25 comprises control switch (not shown) also termed on/off switch, configured to turn on/off nutrient module 25, or the activity of nutrient module 25. In some embodiments, the control switch is functionally associated with circuit board 41b. In some embodiments, the control switch is functionally associated with a switch control component functionally associated with circuit board 41b.

Figure 10:
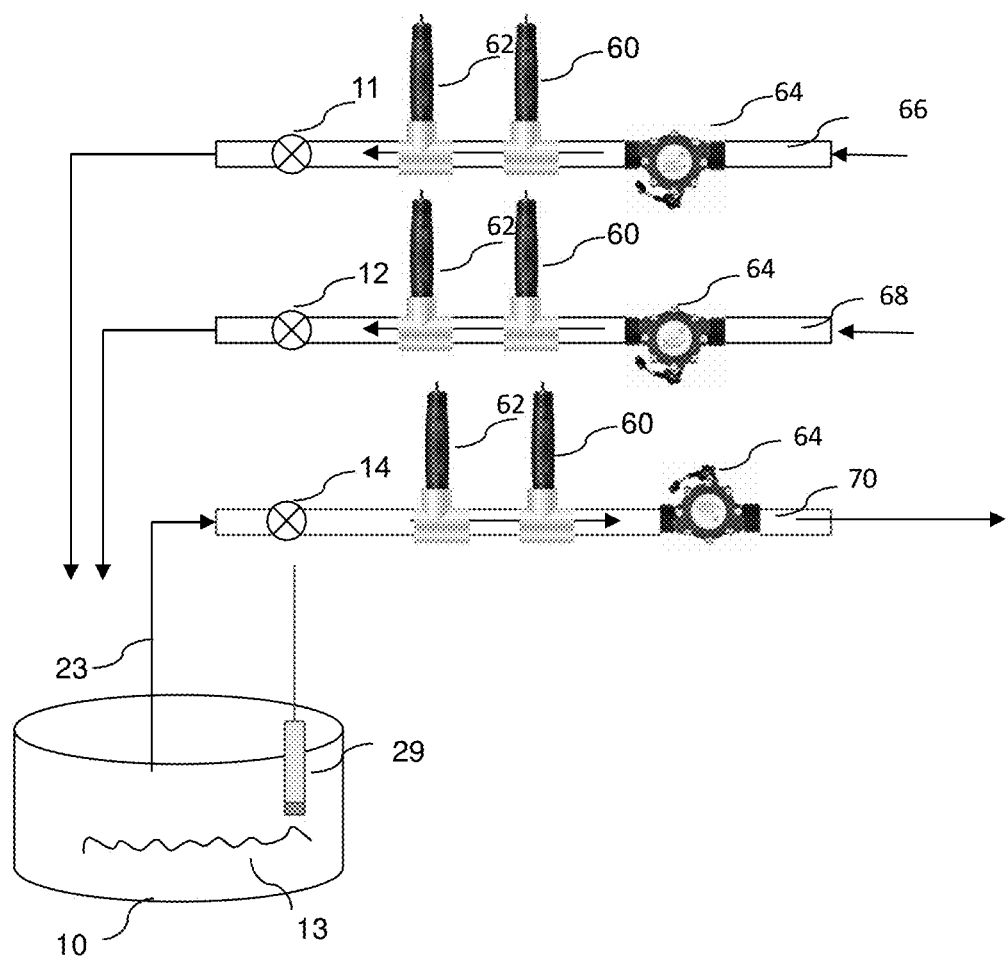
FIG. 10 schematically illustrate a reservoir management module, according to some embodiments.
Figure 11:
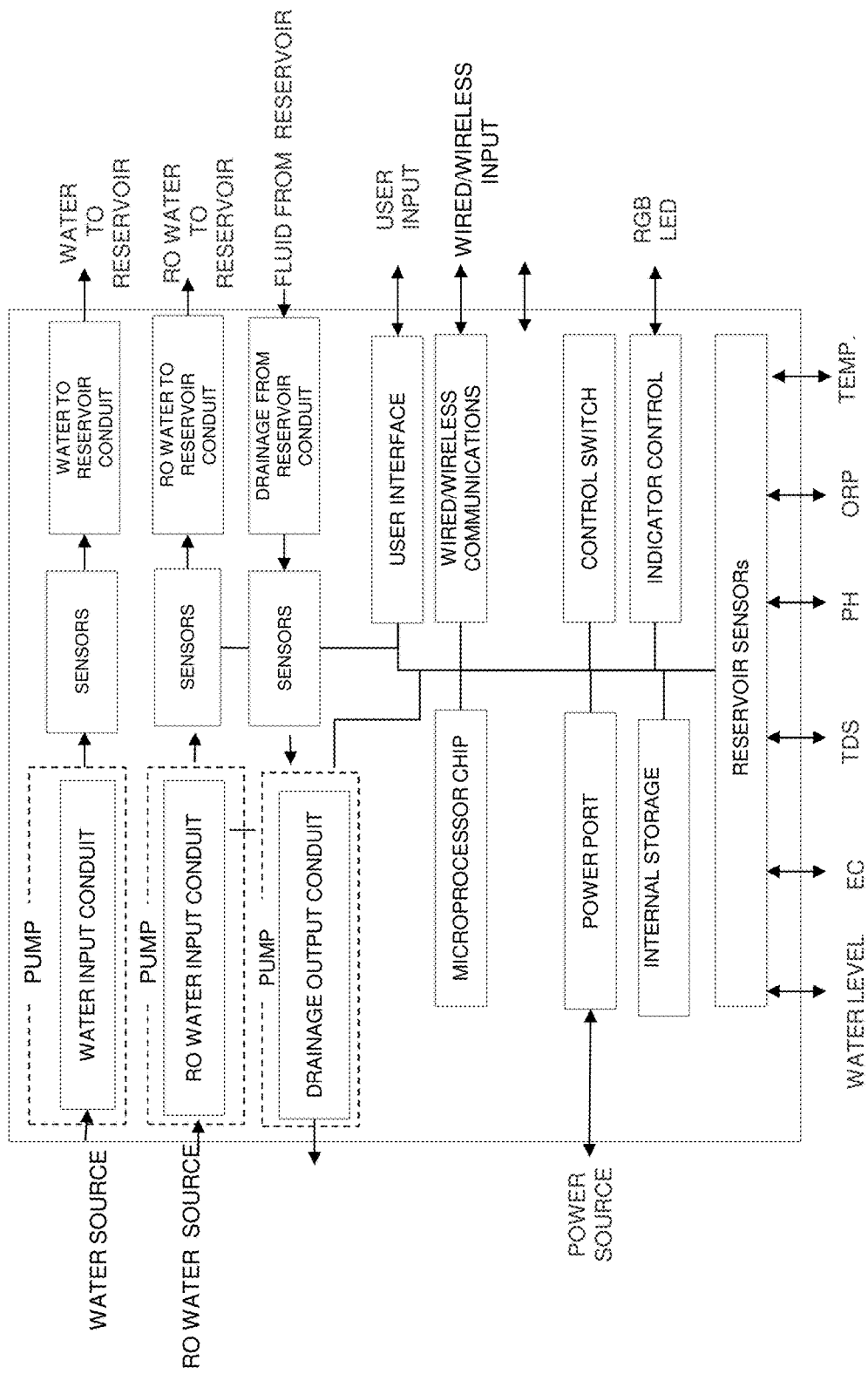
FIG. 11 presents a block diagram of a reservoir management module, according to some embodiments.

Reference is now made to FIGS. 10 and 11 which schematically illustrate, in accordance with some embodiments, reservoir management module 28. Reservoir management module 28 controls the addition of water 70, to a reservoir, such as, reservoir 10, e.g. via valves 11 and 14 that control the flow of water and RO water, respectively. In some embodiments, said control the addition of water comprises at least one of controlling the type of water (e.g. regular or RO), controlling the amount of water, controlling through which valve the additional water flows. Each possibility is a separate embodiment of the present invention.

In some embodiments, system 100 further comprises reservoir management module 28.

Is some embodiments, system 100 comprises reservoir management module 28 as the main module, and optionally, further comprising additional modules, such as, pH module 24 and/or, nutrient module 25, and is devoid of hub 22.

In some embodiments, reservoir management module 28 comprises an internal storage associated with the microprocessor thereof, configured for storage of data related to the operation of reservoir management module 28. In some embodiments, the data related to the operation of reservoir management module 28 comprises data acquired by the water level sensor, properties of the feeding solution, amount of fluids transferred through reservoir management module 28 to feeding solution 13, amount of fluids drained from feeding solution 13 through reservoir management module 28, function of one or more pumps associated with reservoir management module 28.

In some embodiments, the data acquired by the water level sensor indicates change in water level, thereby reservoir management module 28 initiates delivery of a volume of fluids to feeding solution 13 or drainage of a volume of feeding solution 13, wherein said volume is calculated by the microprocessor of reservoir management module 28, using data stored in the internal storage, which includes the concentration of the various components of feeding solution 13.

In some embodiments, the data acquired by the water level sensor indicates reduced water level. In some embodiments, the data acquired by the water level is transmitted to server 21 which in turn provides to instruction to add a volume of fluids to feeding solution 13, wherein the instruction further specify the type of fluids, selected from water and RO water.

In some embodiments, the data acquired by the water level sensor indicates elevated water level. In some embodiments, the data acquired by the water level is transmitted to server 21 which in turn provides to instruction to drain a volume of water to feeding solution 13.

In some embodiments, the data acquired by the water level sensor produce an alert to a user. In some embodiments, the alert is a visible or audible alert produced by an indicator of reservoir management module 28. In some embodiments, the alert is a message sent to a user device.

In some embodiments, module 28 is fluidly connected to a plurality of conduits 66, 68 and 70, and corresponding valves 11, 12, 14, configured to control the flow of fluids (e.g. water, feeding solution) into a feeding solution, such as, feeding solution 13, in order to achieve a required water level, and/or dilute the contents of the feeding solution in order to achieve the desired pH and/or nutrient profile. The valves are also configured to control drainage of fluids from a reservoir, such as, reservoir 10, for example, in order to enable supplementation of the reservoir with specific nutrients, and/or in order to increase the concentration of nutrients in the reservoir, among other purposes.

In some embodiments, the flow of water entering module 28 through conduit 66 to reservoir 10 is allowed when valve 11 is open, wherein opening of valve 11 is controlled by module 28 and is enabled after sensors 60, 62 and 64 measured the pH, EC and flow rate, respectively, of the water entering through conduit 66 and after the measurements have been recorded in the internal storage of module 28. Thus, module 28 is configured for controlling the input flow of water from a water source into a reservoir of feeding solution, such as, reservoir 10.

In some embodiments, the water is tap water.

In some embodiments, the flow of reverse osmosis (RO) water entering module 28 through conduit 68 to reservoir 10 is allowed when valve 12 is open, wherein opening of valve 12 is controlled by module 28 and is enabled after sensors 60, 62 and 64 measured the pH, EC and flow rate, respectively, of the RO water entering through conduit 68 and after the measurements have been recorded in the internal storage of module 28. Thus, module 28 is configured for controlling the input flow of RO water from a source of RO water into a reservoir of feeding solution, such as, reservoir 10.

In some embodiments, reservoir management module 28 controls fluid entrance into reservoir 10 by controlling when to open valves 11 and/or 12 and for how long let any of these valves remain open. In some embodiments, reservoir management module 28 controls the amount of fluid entering reservoir 10 through valves 11 and 12.

In some embodiments, the out-flow of excess (drain) water from reservoir 10 through module 28 via conduit 70 is allowed when valve 14 is open, wherein opening of valve 14 is controlled by module 28. Thus, module 28 is configured for controlling the output flow of drain water from reservoir 10. Optionally, the sensors 60, 62 and 64 may measure the pH, EC and flow rate, respectively, of the drain water exiting through conduit 70.

In some embodiments, reservoir management module 28 controls fluid draining from reservoir 10 by controlling when to open valve 14 and for how long let valve 14 remain open. In some embodiments, reservoir management module 28 controls the amount of fluid draining from reservoir 10 through valve 14. In some embodiments, fluid draining comprises draining of a feeding solution, such as, feeding solution 13 from the reservoir containing same, such as, reservoir 10.

In some embodiments, module 28 comprises at least one pump configured to enable fluid flow through at least one of conduits 66, 68 and 70. In some embodiments, fluid flow through any one or more of conduits 66, 68 and 70 is induced by at least one pump. In some embodiments, module 28 comprises at least one pump configured to enable water flow from water source through conduits 66 to reservoir 10. In some embodiments, module 28 comprises at least one pump configured to enable flow of RO water from RO water source through conduits 68 to reservoir 10. In some embodiments, module 28 comprises at least one pump configured to enable flow of drain feeding solution 13 from reservoir 10 through conduits 70.

In some embodiments, reservoir management module 28 comprises a plurality of sensor ports, configured to connect to a plurality of sensors, wherein at least one sensor port is a water level sensor port configured to connect to a water level sensor 29. In some embodiments, reservoir management module 28 comprises a plurality of water level sensors 29.

In some embodiments, water level sensor 29 is a fluid level sensor selected from glass level gauge, floats, hydrostatic measurement device (e.g. bubbler, differential pressure transmitter, displacer), load cell, magnetic level gauge, capacitance transmitter, magnetostrictive level transmitter, ultrasonic level transmitter, later level transmitter and radar level transmitter. Each possibility is a separate embodiment of the present invention.

In some embodiments, module 28 further comprises one or more sensor ports configured to connect to sensors selected from the group consisting of pH sensor 60, temperature sensor (not shown), EC sensor 62, oxidation-reduction potential (ORP) sensor (not shown), minerals sensor (not shown) and total dissolved solids (TDS; not shown). Each possibility is a separate embodiment of the present invention.

In some embodiments, reservoir management module 28 further comprises a flow rate sensor 64. In some embodiments, the flow rate sensor is a flowmeter. In some embodiments, the flowmeter is selected from obstruction type, inferential, electromagnetic, positive-displacement, vortex shedding, anemometer, ultrasonic and mass. Each possibility is a separate embodiment of the present invention.

In accordance with some embodiments, reservoir management module 28 comprises a circuit board. In some embodiments, the circuit board is a microprocessor chip. In some embodiments, the circuit board comprises, or associates with, pump control circuit board.

In some embodiments, reservoir management module 28 comprises a communication unit, such as, communication unit 34. In some embodiments, the circuit board of reservoir management module 28 communicates with the communication unit. Alternatively, communication between reservoir management module 28 and/or its circuit board and other components of system 100 is afforded by the communication unit.

Communication between reservoir management module 28 and its communication unit is required for various activities, including, but not limited to, transfer of data collected by reservoir management module 28 to storage, such as, server 21, through the communication unit, collection and transfer of data from one or more sensors connected to reservoir management module 28 to server 21, collection and transfer of data from one or more modules connected to reservoir management module 28 to server 21, for further analysis and processing of data, and the like.

In some embodiments, reservoir management module 28 comprises control switch (not shown) also termed on/off switch, configured to turn on/off reservoir management module 28, or the activity of reservoir management module 28. In some embodiments, the control switch is functionally associated with the circuit board of reservoir management module 28. In some embodiments, the control switch is functionally associated with a switch control component functionally associated with the circuit board of reservoir management module 28.

According to some embodiments, any of the modules disclosed herein can be customized to suit growth under any required condition for any type of plant. The modules can be programmed and monitored through user interface 33 which is encompassed in each module of system 100.

Figure 12:
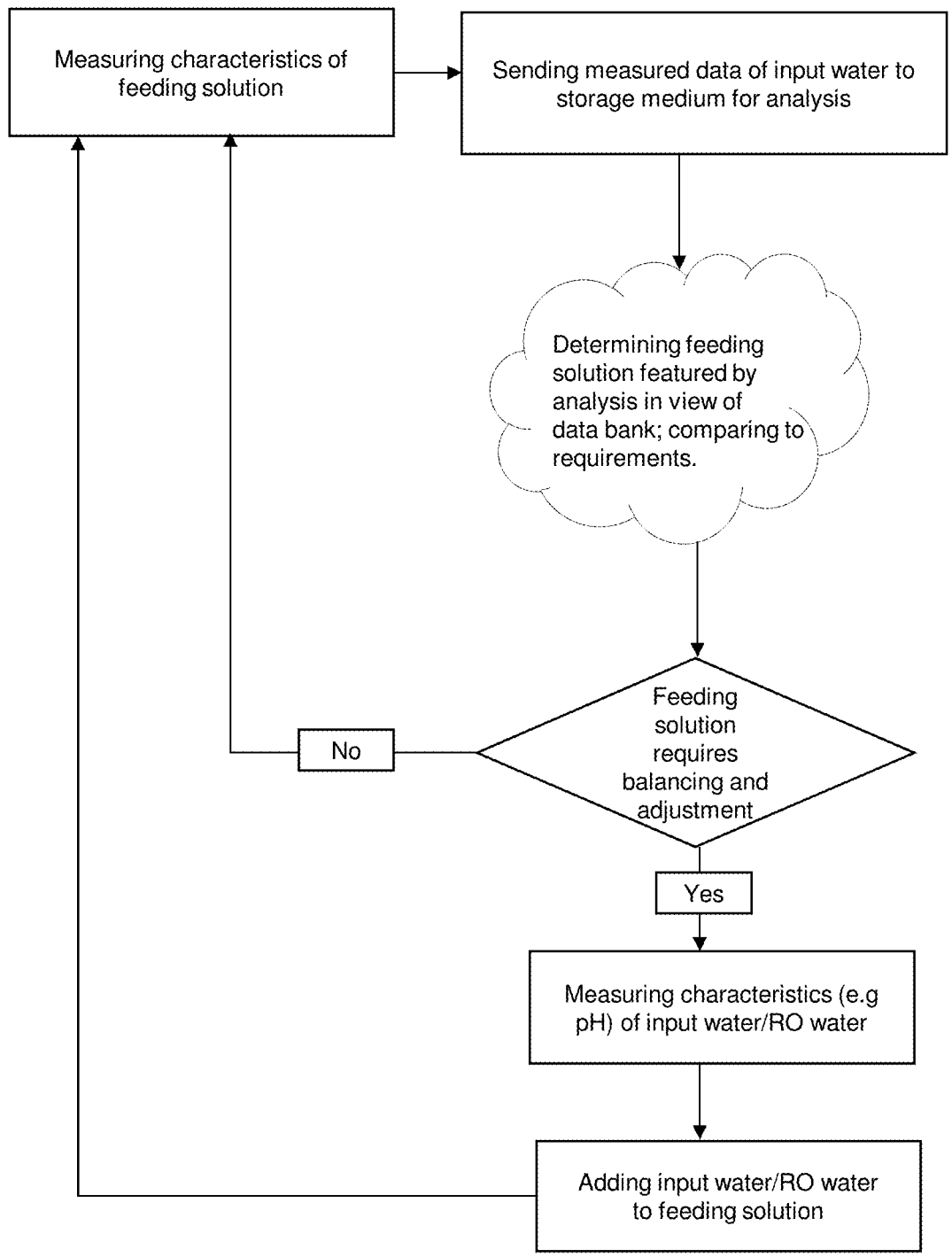
FIG. 12 presents a flowchart of a method for tracking the contents of a feeding solution and replenishing it, according to some embodiments.
Figure 13:
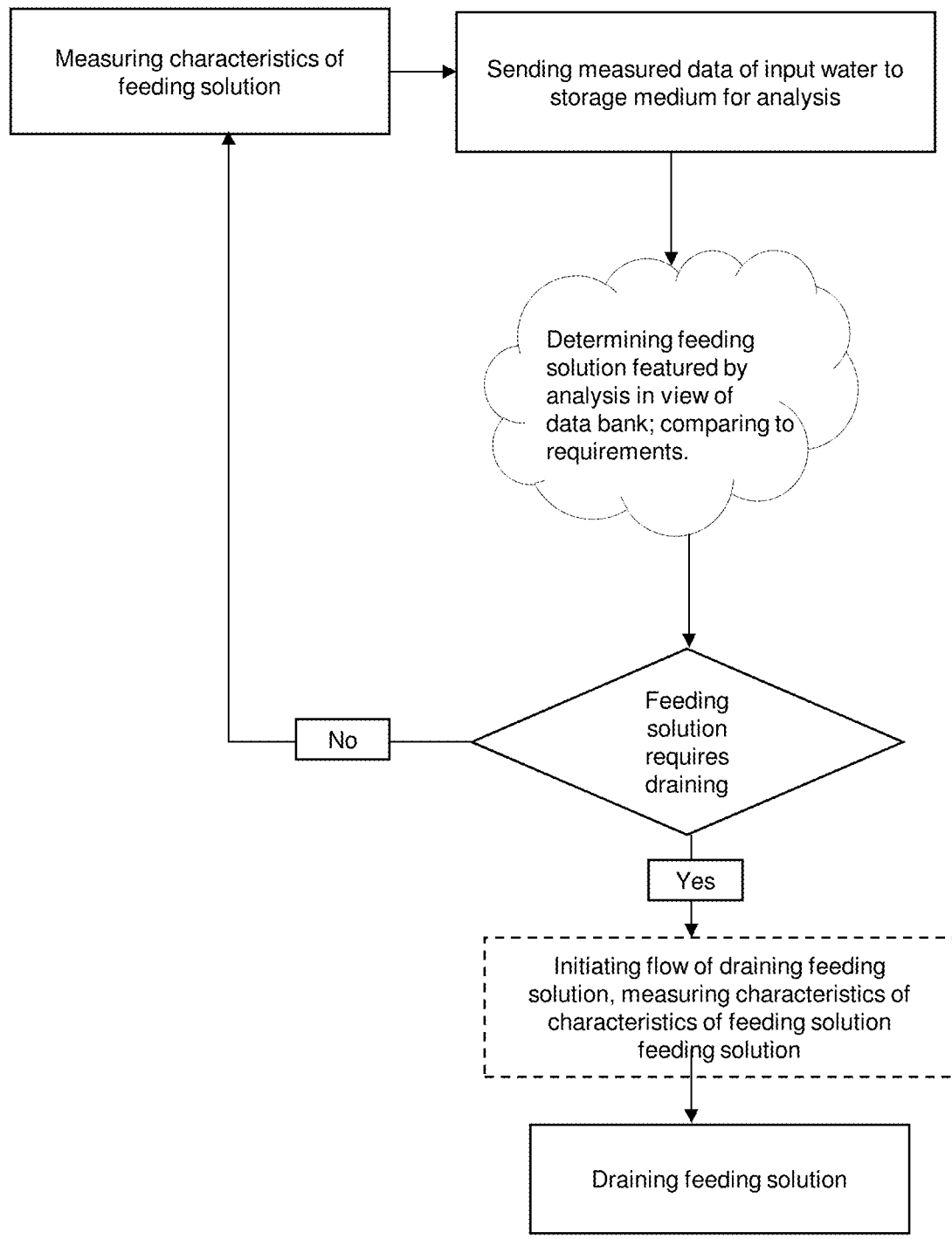
FIG. 13 presents a flowchart of a method for tracking the contents of a feeding solution and draining it, according to some embodiments.

Reference is now made to FIGS. 12 and 13 which present a flowchart of a method for tracking the contents of a feeding solution and replenishing it, and a flowchart of a method for tracking the contents of a feeding solution and draining it, respectively.

Accordingly, in some embodiments, there is provided a computer-implemented method for monitoring the level of components associated with plant growth, the method comprising the steps of:
 (a) providing the system disclosed herein and a soil-less system comprising plants grown in a reservoir comprising a feeding solution;
 (b) measuring, a plurality of times, the level of at least one component associated with plant growth;
 (c) identifying a change in the at least one component, between an early measurement to at least one later measurement;
 (d) determining that the identified change requires adjusting the contents of the feeding solution, wherein said identifying and determining is carried out by at least one of the server and the hydroponic device and comprises applying database interrogation on the at least one later measurement with respect to the data bank.

In some embodiments, the method further comprising repeating steps (b) to (e) periodically.

In some embodiments, the change in the at least one component, between an early measurement to at least one later measurement refers to deviation from a predefined level of said at least one component.

In some embodiments, said measuring is performed with the at least one sensor configured to measure the level of the at least one component associated with plant growth.

In some embodiments, the at least one component is selected from the group consisting of fluid level, pH, EC, nutrient, oxidation-reduction potential, temperature, minerals and total dissolved solids.

In some embodiments, the method further comprising adjusting the feeding solution by adding at least one solution comprising a required amount of the at least one component, thereby adjusting the feeding solution to include the predefined level of said at least one component, wherein the volume of the added solution, the time intervals between consecutive adding and the amount of the at least one component included therein are determined by at least one of the server and the hydroponic device.

In some embodiments, said adding to the feeding solution comprising transferring from one or more containers fluids that form the added solution.

In some embodiments, said adding comprises pumping through conduits fluidly connected to at least one pump.

In some embodiments, the method further comprising adjusting the feeding solution by draining a predetermined volume of feeding solution, wherein the volume of the drained feeding solution and the time intervals between consecutive draining are determined by at least one of the server and the hydroponic device.

In some embodiments, said continuously comprises a plurality of time per second.

In some embodiments, there is provided a method for monitoring the level of components associated with plant growth, the method comprising the steps of:
 (a) providing a soil-less system comprising plants grown in a reservoir comprising a feeding solution;
 (b) measuring, a plurality of times, the level of at least two components associated with plant growth, wherein at least one component is fluid level of the feeding solution in the reservoir, and wherein each of the remaining components associated with plant growth is associated with the contents of the feeding solution;
 (c) identifying a negative change in at least one of the at least two components, between an early measurement to at least one later measurement;
 (d) determining the contents and volume of fluids to be added to the feeding solution for obtaining a required fluid level and a required feeding solution contents, wherein a negative change in fluid level refers to decrease in the level of the feeding solution within the container and a negative change in each of the remaining components associated with plant growth refers to deviation from a predefined level of each of said remaining components, and wherein said determining the contents and volume of fluids to be added to the feeding solution comprises:
  i. calculating the volume of fluids required to add, if any, to the feeding solution to reach the required fluid level of the feeding solution; and
  ii. determining the concentration of each of the remaining components associated with plant growth in the calculated volume of fluids, required to add to the feeding solution to reach the predefined level of each of said remaining components and the required fluid level of the feeding solution,
 (e) adding to the feeding solution a fresh fluid having said volume of fluids and said concentration of each of the remaining components, thereby obtaining a replenished feeding solution having the required fluid level and the predefined level of said each of the remaining components, or withdrawing a volume of fluids from the feeding solution thereby obtaining a feeding solution having the required fluid level and the predefined level of said each of the remaining components;
 (f) repeating steps (b) to (e), periodically.

In some embodiments, the replenished feeding solution is also referred to as 'the current feeding solution'.

The required fluid level and the predefined level of said each of the remaining components (that provide the required feeding solution contents) are values calculated based on the type of irrigation water used at the location of the system and plants, the type of plants, the weather and any other specific parameter which is required for obtaining the desired growth and crop. These values are reference values, specific for each plant, environment (water, season), and stage of growth. These values are stored in storage media and used by the method and the system disclosed herein for calculating changes in fluid level of feeding solution contents, and for calculating the volume and contents of the fluids that need to be added to the feeding solution in order to bring it back to balance, when required.

In situations where the level of the feeding solution decreases (e.g. due to evaporation, and/or consumption by the plants), the concentrations of the various components of the remaining feeding solution increases, and the pH of the feeding solution changes. Thus, the method of the invention provides, through complicated calculations carried out by processors utilizing machine learning algorithms among others, the volume of fluids required to replenish the feeding solution, in order to meet a predefined fluid level, together with the concentration of one or more nutrients (nutrients, fertilizer and minerals, collectively referred to as nutrients) in said volume, such that, when the volume and contents of the added fluids bring the feeding solution to optimum, namely, to a fluid level that meets the predetermined fluids level and the contents that meets the predetermined contents.

In some embodiments, the machine learning algorithms used by the systems and methods disclosed herein, include, but are not limited to, linear regression, logistic regression, decision tree, SVM, Naive Bayes, kNN, K-Means, Random Forest, Dimensionality Reduction Algorithms and Gradient Boosting algorithms. Each possibility is a separate embodiment of the present invention.

Thus, in some embodiments, said identifying a negative change in at least one of the at least two components, between an early measurement to at least one later measurement, comprises identifying a negative change in the fluid level, thereby the contents of the fluids to be added to the feeding solution for obtaining the required feeding solution contents includes an amount of each of the remaining components that will complement the feeding solution such that when added in a volume that is required to reach the required fluid level will result with a replenished feeding solution having the required fluid level and the predefined level of said each of the remaining components.

In some embodiments, said identifying a negative change in at least one of the at least two components, between an early measurement to at least one later measurement, comprises identifying a negative change in at least one of the remaining components associated with plant growth, wherein the negative change in an overshoot in the concentration of at least one of the remaining components associated with plant growth, thereby step (e) comprises withdrawing a certain volume of fluids from the feeding solution thereby obtaining a feeding solution having the required fluid level and the predefined level of said each of the remaining components.

In some embodiments, step (e) further comprises adding to the feeding solution a volume of water, thereby obtaining a feeding solution having the required fluid level and the predefined level of said each of the remaining components. In some embodiments, the volume of water is a volume of RO water.

In some embodiments, said identifying a negative change in at least one of the at least two components, between an early measurement to at least one later measurement, comprises identifying a negative change in the fluid level and in the level of at least one of the remaining components, thereby the contents of the fluids to be added to the feeding solution for obtaining the required feeding solution contents includes an amount of each of the remaining components that will complement the feeding solution such that when added in a volume that is required to reach the required fluid level will result with a replenished feeding solution having the required fluid level and the predefined level of said each of the remaining components.

The terms 'required feeding solution contents' and 'predefined level of each of the remaining components' are interchangeable.

In some embodiments, the contents of the fluids to be added to the feeding solution for obtaining the required feeding solution contents includes an amount of each of the remaining components that will complement the feeding solution such that when added in a volume that is required to reach the required fluid level will result with a replenished feeding solution having the required fluid level and the predefined level of said each of the remaining components.

In some embodiments, measuring the fluid level of the feeding solution is carried out by at least one fluid level sensor.

In some embodiments, the remaining components associated with plant growth comprise pH and minerals.

In some embodiments, said measuring a plurality of times comprises measuring a plurality of time per second, a plurality of times per a tenth of a second, a plurality of times per a hundredth of a second, and plurality of time per millisecond. Each possibility is a separate embodiment of the present invention.

The term "plurality" as used herein refers to 'at least two' or 'two or more'.

In some embodiments, the frequency of measuring is determined by a user.

In some embodiments, the method further comprises providing a processor, the processor is associated with a storage media comprising a data bank comprising the required fluid level, the required feeding solution contents and the predefined level of each of said remaining components, and wherein the frequency of measuring is determined automatically by the server.

In some embodiments, the indicator provides an indication, if the change in fluid level is negative.

In some embodiments, the method further comprises:
(g) measuring the electrical conductivity of the feeding solution in parallel to fluid level measurements, according to steps (b) to (d);
(h) calculating the change in electrical conductivity, between an early measurement of electrical conductivity to at least one later measurement, and storing the calculated change in a server;
(i) adding fluids to the feeding solution, if at least one of the latest measurements of electrical conductivity indicates values outside a desired range of electrical conductivity, wherein the amount of fluids added results with feeding solution having a fluid level equal to the required fluid level and an electrical conductivity within the range of the desired range of electrical conductivity; and
(j) repeating steps (g) to (i).

In some embodiments, the measured electrical conductivity corresponds to the pH of the feeding solution.

In some embodiments, the latest measurements or measurement refers to the current measurement.

pH is a measure of acidity or basis of irrigation water. The pH level in the growth medium directly affects the ability of the roots to absorb nutrients. Each plant nutrition component has a pH range in which its absorption of the plant is maximum, however there is a range of pH in which all the essential components of the plant can be absorbed. Too high or too low levels of acidity will impair the ability of the plant to absorb the minerals and fertilizers from the irrigated water.

In some embodiments, the desired range of electrical conductivity corresponds to pH range of 5.5 to 6.0.

In some embodiments, the method further comprises:
(k) measuring the level of nutrients in the feeding solution in parallel to fluid level measurements, according to steps (b) to (d);
(l) calculating the change in nutrient level, between an early measurement of nutrient level to at least one later measurement, and storing the calculated change in a server;
(m) adding nutrient solution to the feeding solution, if at least one of the latest measurements of nutrient level indicates values outside a desired range of nutrient level, wherein the amount of nutrient solution added results with feeding solution having a fluid level equal to the required fluid level and nutrient level within the range of the desired range of nutrient level; and
(n) repeating steps (k) to (m).

In some embodiments, measuring the level of nutrients comprises identifying the one or more nutrients the level of which is deficient, and adding a nutrient solution comprising said one or more nutrients, wherein the volume of the added nutrient solution does not affect the fluid level of the feeding solution, or increases the fluid level of the feeding solution to the required fluid level, and wherein the concentration of said one or more nutrients in the volume of the added nutrients solution is a concentration providing the feeding solution a nutrient level within the range of the desired nutrient level, when added thereto.

It is to be understood that the concentration of the one or more nutrients required to reach again the desired range of nutrients is obtained by evaluating the amount of the one or more nutrients that is required to add, and providing this amount in a volume which does not affect the fluid level of the feeding solution, or increases the fluid level of the feeding solution to the required fluid level. This volume determines the concentration of the one or more nutrients in the added nutrient solution.

A volume of the added nutrient solution which does not affect the fluid level of the feeding solution, is a volume that is small enough, relative to the overall volume of the feeding solution, such that, when added, does not significantly change the contents and concentration of the various nutrients in the feeding solution. After fertilization, the pH is adjusted.

A non-significant change may be a change that is below detection levels or that is within the range of the required feeding solution contents.

It is to be understood that a required feeding solution contents refers to the pH and nutrients concentrations which meet the requirement and/or are optimal for the plant in the feeding solution, and its growth stage.

In some embodiments, the concentration of the one or more nutrients in the added nutrient solution is calculated by the circuitry board of the hub.

In some embodiments, the concentration of the one or more nutrients in the added nutrient solution is calculated by the circuitry board of the nutrient module.

In some embodiments, the concentration of the one or more nutrients in the added nutrient solution is calculated by the micro-processor of server 21.

In some embodiments, said measuring the level of nutrients in the feeding solution comprising taking a photo of the plant(s) a plurality of times in a given time period.

In some embodiments, said calculating the change in nutrient level, between an early measurement of nutrient level to at least one later measurement comprising comparing each photo in the plurality of photos to a reference scale, and applying image analysis to determine change in said each photo relative to the reference scale, wherein a negative change indicates nutrient deficiency.

In some embodiments, each photo is a colored photo. In some embodiments, the reference scale is a color scale comprising a range of colors relevant to the plant grown in the system, wherein part of the color scale correspond to the colors of a healthy plant, and other parts of the scale correspond to the color of the plant under various nutrient deficiencies.

In some embodiments, the comparison (image analysis) is carried out by server 21.

The methods disclosed herein enable to model management of soil-less growing techniques, buy continuous real-time measuring, storing and calculating changes overtime, of various parameters in the plant and the feeding solution, as exemplified in FIGS. 12-13. This intelligent approach allows learning the influence of each parameter, and hence develop improved, time consuming and cost-effective methods and system of soil-less plant growth.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although steps of methods according to some embodiments may be described in a specific sequence, methods of the disclosure may include some or all of the described steps carried out in a different order. A method of the disclosure may include a few of the steps described or all of the steps described. No particular step in a disclosed method is to be considered an essential step of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

The invention claimed is:
1. A system for plant growing comprising:
at least one sensor;
a data bank;
a controller; and
a hydroponic device capable of data communication with the data bank, the hydroponic device comprising:

a. at least one microprocessor;
b. at least one communication board configured to communicate with the data bank;
c. at least one sensor port connectable to the at least one sensor, the at least one sensor functionally connectable to the at least one sensor port, wherein the at least one sensor continuously monitors contents of a soilless plant feeding solution or contents of fluids added or drained from the feeding solution, wherein the at least one communication board transfers each measurement performed by the at least one sensor to at least one of the data bank and the hydroponic device; and wherein the data bank is a dynamic data bank comprising data from water facilities worldwide, measurements of the soilless plant feeding solution collected by the at least one sensor, values related to the contents of the soilless plant feeding solution uploaded by a user, values related to the location and weather of the soilless plant feeding solution and values associating contents of a feeding solution to plant strain or type;

wherein the device being connectable to at least one pump configured for pumping a solution required for adjusting the contents of the soilless plant feeding solution and configured to operate the pump for such adjustment based on the data from the dynamic data bank; and wherein the controller predicts changes in the contents of the soilless plant feeding solution, based on the values stored in the data bank and utilizing at least one machine learning algorithm.

2. The system of claim 1, wherein the at least one sensor is configured to be dipped in the soilless plant feeding solution, and monitor the contents of the soilless plant feeding solution.

3. The system of claim 2, further comprising at least one module connectable to the device, wherein the at least one module comprises a microprocessor, and a communication unit, and wherein the at least one module is connected to at least one pump and at least one container containing a solution required for adjusting the contents of the soilless plant feeding solution.

4. The system of claim 3, wherein the at least one module is a pH module and the at least one sensor is a pH sensor, and wherein the pH module comprises a communication unit, configured to enable communication between the pH module and at least one of the device and the data bank, at least one pump configured to pump an acidic or alkaline solution to the feeding solution, wherein the operation of the at least one pump is controlled by the device and/or a server; or
the at least one module is a nutrient module and the at least one sensor is a nutrient sensor, and wherein the nutrient module comprises a communication unit, configured to enable communication between the nutrient module and at least one of the device and the data bank, at least one pump configured to pump a solution of nutrients to the feeding solution, wherein the operation of the pump is controlled by the device and/or a server.

5. The system of claim 3, further configured to adjust the feeding solution to a required feeding solution contents, by activating pumps associated with one or more of the at least one module.

6. The system of claim 4, wherein the pH module is fluidly connected to a plurality of containers, at least one container of said plurality of containers comprising an acidic solution and at least one container of said plurality of containers comprises an alkaline solution; and/or wherein the nutrient module is fluidly connected to at least one container comprising the solution of nutrients.

7. The system of claim 6, wherein the pH module comprises a plurality of pumps, wherein at least one pump is fluidly connected to the at least one container comprising the acidic solution and at least one pump is fluidly connected to the at least one container comprises the alkaline solution and/or wherein the nutrients module comprises at least one pump fluidly connected to the at least one container comprising the solution of nutrients.

8. The system of claim 4, wherein the nutrient module is an EC sensor or a visualization unit comprising a camera or a video camera.

9. The system of claim 4, wherein the microprocessor of the pH module monitors and analyzes the changes and/or changes' gradient of pH level as a function of time and creates a unique mathematical changes patterns profile, indicating the presence of hostile elements inside the feeding solutions able to harm the plant and indicating consumption of certain minerals by the plants' roots.

10. The system of claim 1, wherein the hydroponic device further comprises a user interface, configured to enable a user to perform at least one of the activities selected from: review the performance of the hydroponic device or any module connected thereto, add new commands, algorithms and software to the hydroponic device and to any of the module connected thereto, and correct errors in the operation of the hydroponic device and any of the modules connected thereto.

11. The system of claim 1, wherein the hydroponic device comprises a reservoir management module, and wherein the at least one sensor port is configured to functionally connect to at least one fluid level sensor adapted to measure fluid level of the feeding solution.

12. The system of claim 11, wherein the reservoir management module is fluidly connected to a plurality of conduits and corresponding valves, at least one conduit is configured to allow flow of a predetermined volume of water from a water source to the feeding solution, wherein the flow of water is controlled by a corresponding valve, and at least one conduit is configured to allow draining a predetermined volume of feeding solution, wherein the flow of draining is controlled by a corresponding valve, and wherein the predetermined volume is determined by the at least one microprocessor.

13. A computer-implemented method for soilless plant growing, the method comprising the steps of:
(a) providing the system of claim 1, and a soil-less plant in a reservoir comprising a feeding solution;
(b) measuring, a plurality of times, the level of at least one component associated with plant growth;
(c) identifying a change in the at least one component, between an early measurement to at least one later measurement;
(d) determining if the identified change requires adjusting contents of the feeding solution, wherein said determining is carried out utilizing at least one of the data bank and the hydroponic device and comprises applying database interrogation on the at least one later measurement with respect to the data bank; and
(e) predicting changes in contents of the feeding solution, based on values stored in the data bank and utilizing at least one machine learning algorithm.

14. The method of claim 13, further comprising repeating steps (b) to (e) periodically.

15. The method of claim 13, wherein the change in the at least one component, between an early measurement to at least one later measurement refers to deviation from a predefined level of said at least one component.

16. The method of claim 13, wherein said measuring is performed with the at least one sensor configured to measure the level of the at least one component associated with plant growth, wherein the at least one component is selected from the group consisting of fluid level, pH, EC, nutrient, oxidation-reduction potential, temperature, minerals and total dissolved solids.

17. The method of claim 16, wherein the at least one component measured is pH, and wherein the method further comprising the steps of:
(a) monitoring and analyzing the changes and/or changes' gradient of pH level as a function of time by a microprocessor; and
(b) creating a unique mathematical changes patterns profile, indicating the presence of hostile elements inside the feeding solutions able to harm the plant and indicating consumption of certain minerals by the plants' roots.

18. The method of claim 16, wherein the at least one component measured is pH, and wherein the determining is done according to a dynamic pH balance/adjustment algorithm which is configured to calculate several chemical and physical parameters of the amount of water inside the feeding solution, chemical composition of the feeding solution, chemical composition of the pH increasing/reducing balance fluids, and current and target pH level, and is configured to trigger the injection of an exact amount of pH increasing/reducing substances to the feeding solution in order to maintain the desired pH level of the feeding solution.

19. The method of claim 16 wherein the at least one component measured is pH, and wherein the method further comprising the step of changing the pH level of the feeding solution at a variant time intervals in order to allow absorption of an individual and/or a group of element by the plants roots, without adding more nutrient to the feeding solution.

* * * * *